United States Patent [19]

Kovacs et al.

[11] 4,159,760

[45] Jul. 3, 1979

[54] METHOD OF AND APPARATUS FOR FEEDING RANDOMLY RECEIVED ITEMS

[75] Inventors: Lloyd Kovacs; Charles G. Hart, Sheboygan, Wis.

[73] Assignee: Hayssen Manufacturing Company, Sheboygan, Wis.

[21] Appl. No.: 787,061

[22] Filed: Apr. 13, 1977

[51] Int. Cl.² ............................................ B65G 47/31
[52] U.S. Cl. ..................................... 198/419; 53/493; 198/420; 198/460; 198/461; 198/729
[58] Field of Search ............... 198/347, 418, 419, 420, 198/459, 460, 461, 571, 572, 576, 577, 578, 601, 728, 729, 733; 53/59 R

[56] References Cited

U.S. PATENT DOCUMENTS

| | | | |
|---|---|---|---|
| 1,829,322 | 10/1931 | Williams | 198/418 |
| 2,631,716 | 3/1953 | Kottmann | 198/728 |
| 2,930,475 | 3/1960 | Muhlenbruch | 198/601 X |
| 3,224,549 | 12/1965 | Cella et al. | 198/419 |
| 3,452,856 | 7/1969 | Brittain | 198/466 |
| 3,643,786 | 2/1972 | Wilkes | 198/729 |
| 3,938,650 | 2/1976 | Holt | 198/425 |

Primary Examiner—Robert B. Reeves
Assistant Examiner—James L. Rowland
Attorney, Agent, or Firm—Koenig, Senniger, Powers & Leavitt

[57] ABSTRACT

Methods of and apparatus for feeding items (or groupings of items) one after the other to apparatus, such as a flight conveyor, which cycles continuously at a steady cycling rate are disclosed with an item being fed to the apparatus during a portion of each cycle thereof and with the items being randomly delivered to the means feeding the items at an average rate. The method and apparatus of this invention involve feeding a selected number of items one at a time from each of the backlogs of accumulated items and conveying them forward for placement on the apparatus in timed relation to the cycling rate of the apparatus.

27 Claims, 27 Drawing Figures

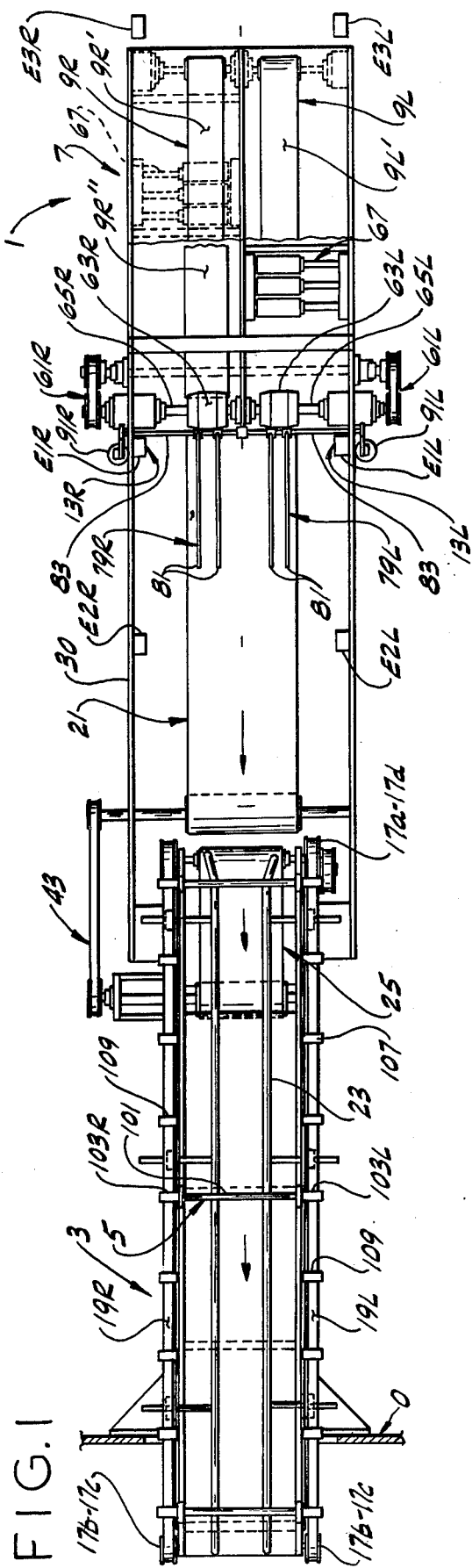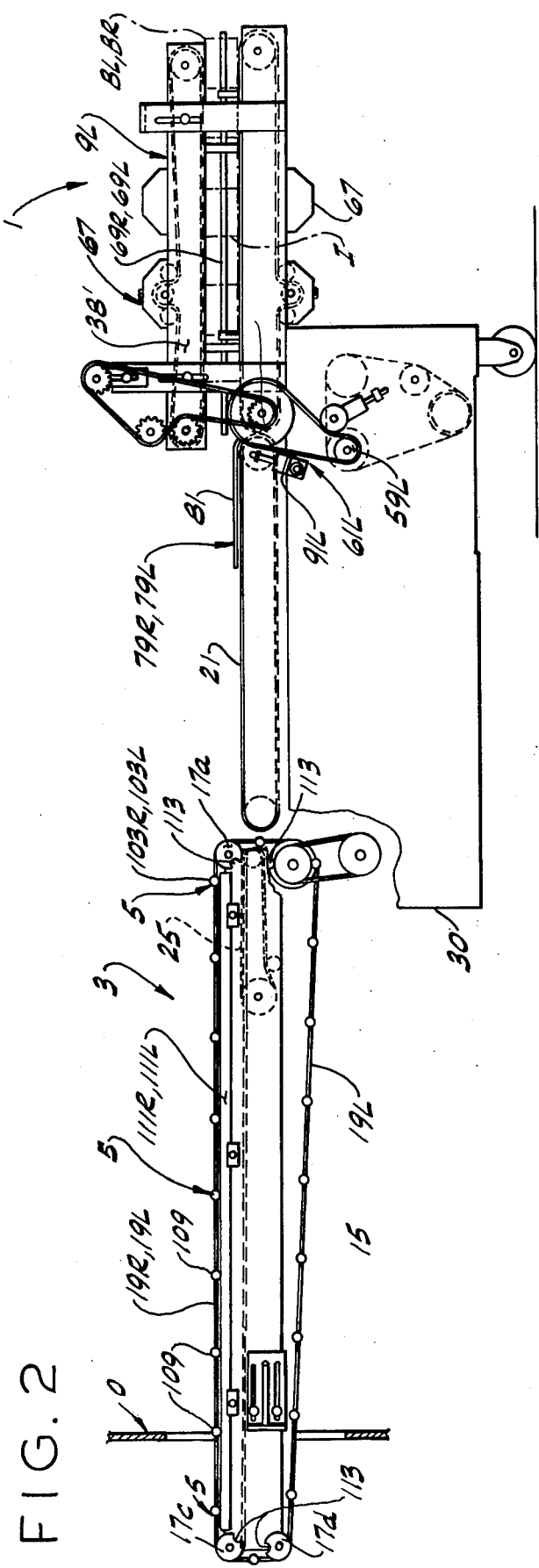

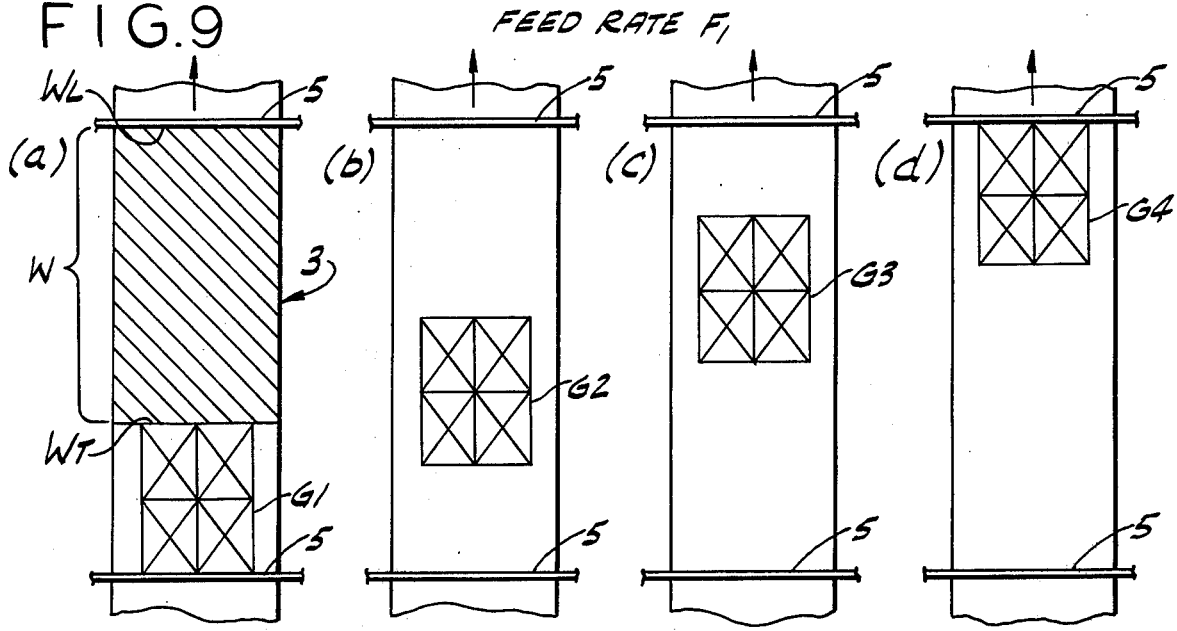
FIG.9
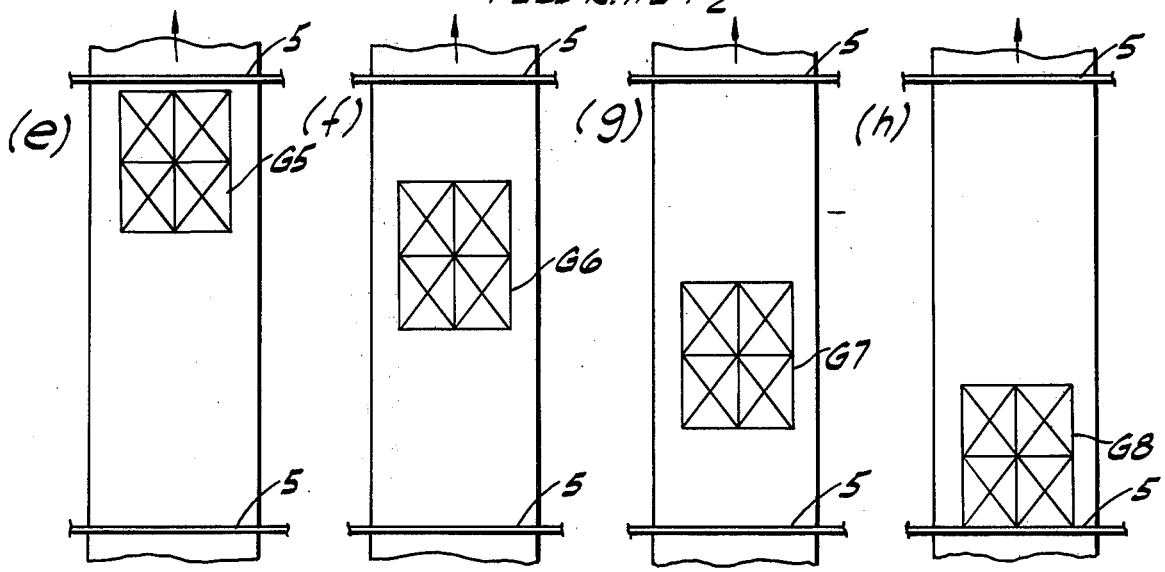
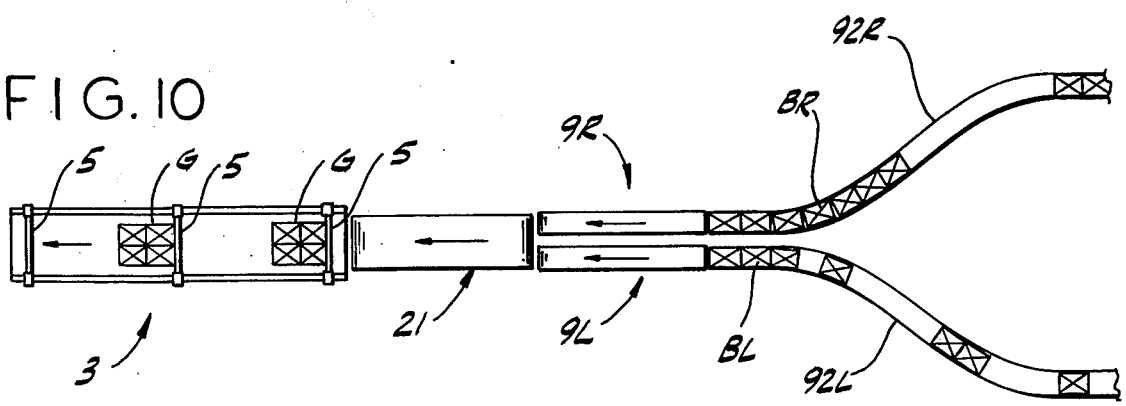
FIG.10

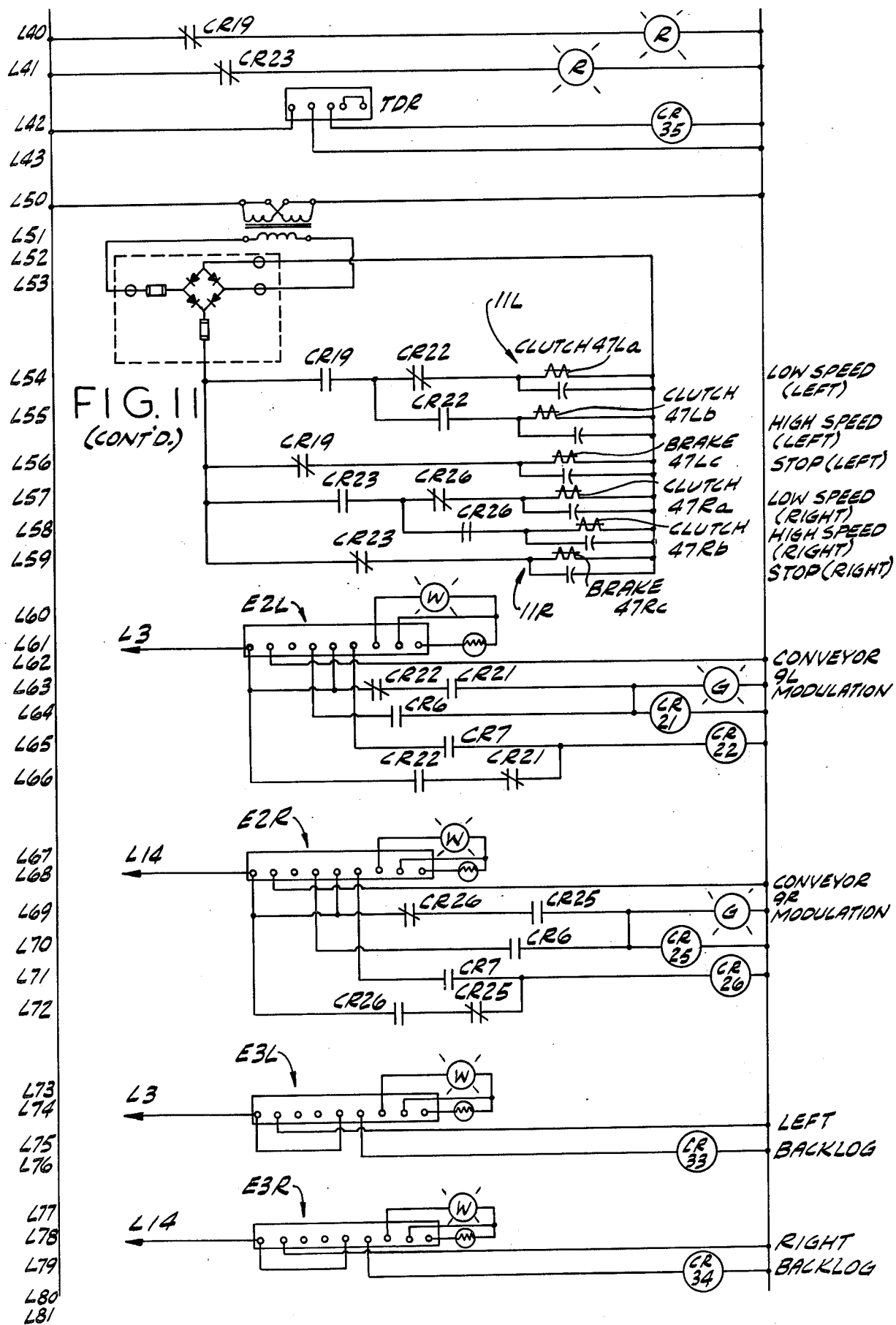

METHOD OF AND APPARATUS FOR FEEDING RANDOMLY RECEIVED ITEMS

BACKGROUND OF THE INVENTION

This invention relates to methods of and apparatus for conveying randomly received items, such as rolls of toilet tissue or paper towels, and for placing these items on apparatus, such as an infeed flight conveyor for an overwrap machine or the like, which is continuously operable at a steady cycling rate.

In the manufacture of toilet tissue or paper towels, the paper is wound onto an elongate mandrel of cardboard tubing or the like to form a log approximately ten feet (3 m.) in length. These logs are then cut to form package-size rolls either by a slitter winder or by a roll saw. Typically, the rolls are then wrapped in an overwrap machine prior to being bulk-packed for shipment. Whether the rolls of towels or tissue are cut by a slitter winder or by a roll saw, the rolls are often intermittently and randomly delivered to the overwrap machine. Typically, overwrap machines operate most desirably if they are fed items operated at a steady and regular pace so as to achieve the high wrapping rate at lowest possible machine speed. It is usually preferred to operate overwrap machines continuously without skipping a wrapping cycle to provide the best possible operating efficiency of the machine. After skipping one or more wrapping cycles, registration problems often arise with the first item wrapped by the overwrap machine upon start up.

Usually an overwrap machine is fed items to be wrapped from more than one supply (i.e., from more than one slitter winder or log roll saw). Items may be fed to the overwrap machine from either one or the other of the supplies, or from both of the supplies simultaneously if, for example, a grouping of items are to be wrapped, or alternately from one supply and then the other. It has heretofore been a problem to balance the items in the various supplies so as to insure an adequate supply exists to feed the overwrap machine in the event the supply of items is momentarily interrupted or to prevent the backlog of items in the other supply from becoming excessive. It has also been a problem to form groupings (e.g., a 2×2 array of rolls of toilet tissue) of the items to be fed to the overwrap machine.

In some known item-conveying and pacing systems which randomly receive items and deliver them to a timed apparatus (e.g., a flight conveyor) rolls of paper towels or toilet tissue were abruptly stopped and started and were changed from one level to another. This sometimes resulted in the rolls becoming partially unrolled, thus making them difficult to wrap. Upon abruptly stopping and starting the rolls, certain of the known pacing conveyor systems caused the rolls to "telescope" (i.e., to cause the center of the roll and the roll case to project outwardly at one end of the roll and inwardly at the other end of the roll).

Reference may be made to the following U.S. Pat. Nos. which are in the same general field as the apparatus of this invention: 3,452,856, 3,459,289, 3,656,606, 3,794,154 and 3,938,650.

In several of the above-noted prior art references, conveying systems are disclosed which utilize a differential drive system responsive to an electric eye or other sensor which detected the position of an item relative to the flights of a flight conveyor and speeded up or slowed down one conveyor in the system relative to another conveyor so as to place the item at a desired location on the flight conveyor. These prior systems, however, required that the differential drive be operated on almost every cycle of the flight conveyor and the margin of error was, in many instances, small. This resulted in the conveyor system skipping placement of an item on the flight conveyor at relatively frequent intervals. Also, these prior art systems were not, for the most part, adapted to receive and feed items from a plurality of item sources or to form groupings of items to be wrapped.

SUMMARY OF THE INVENTION

Among the many objects and features of the present invention may be noted the provision of methods of and apparatus for feeding randomly received items to apparatus, such as to the infeed flight conveyor of an overwrap machine or the like, which reliably feeds a selected number of items constituting a grouping onto the flight conveyor in timed relation therewith in such manner that the overwrap machine operates continuously without skipping of placement of a grouping of items on the flight conveyor; the provision of such method and apparatus in which a multiple-item grouping or unit array may be formed from one or more supply sources of items and in which this grouping is fed forward to the flight conveyor on each operational cycle thereof; the provision of such a method of and apparatus in which items are randomly supplied from a plurality of sources and in which the usage of items from these sources is automatically balanced; the provision of such apparatus which does not damage the items as they are fed forward; the provision of such apparatus which is readily adjustable to accommodate various-sized items and to accommodate different numbers of items to be conveyed; the provision of such apparatus which doen not change the direction or elevation of the items as they are fed forward; and the provision of such apparatus which is of rugged construction and which is reliable in high speed packaging operations.

Briefly, the method of this invention relates to feeding items to apparatus, such as a flight conveyor, which cycles continuously at a steady cycling rate with a predetermined grouping of items being placed on the apparatus during a portion of each cycle thereof, the cycle portion being referred to as a window and the latter having a leading and a trailing boundary. The items are randomly received from a plurality of sources. The method comprises accumulating a backlog of items randomly received from the sources, one backlog for each source. A selected plurality of items is released from each of the backlogs during each cycle of the apparatus to form a grouping. The selected plurality of items forming the grouping is conveyed forward in timed relation to the apparatus for placement of the grouping in a respective window of the apparatus.

In another method of this invention of feeding items one after the other to apparatus which cycles at a steady cycling rate with an item being fed to the apparatus during a portion of each cycle, this cycle portion being referred to as a window. The items are randomly supplied by first and second supply means with the sum of the average supply rates of the first and second supply means being generally equal to the rate the items are fed to the apparatus. The method comprises accumulating a first and second backlog of items randomly received from the first and second supply means. One or more items are then fed from the first backlog, one item at a time, and conveyed forward for placement of the items in a respective window at a rate faster than the first supply rate. Feeding is terminated from said first backlog and is initiated from the second backlog, one item at a time. These items are conveyed from the second backlog forward for placement in a respective window at a rate faster than the second supply rate. Feeding from the second backlog is then terminated and feeding from the first backlog is initiated. The four above-defined steps are repeated so as to continuously feed items from said backlogs whereby a selected number of items is placed in each window of said apparatus.

In still another method of this invention N items are placed in between successive flights of a continuously operable flight conveyor operating at a steady cycling rate, the items being supplied by n supply means with each of the supply means randomly supplying items. The method comprises accumulating n backlogs of items, one backlog for each of the supply means, and releasing k items from each of the backlogs and conveying them forward for placement between successive flights of the flight conveyor in timed relation to the flights during each cycle of the flight conveyor, where N=k.n, and where k is an integer greater than one. The items placed between successive flights are substantially arranged in an array of rows and columns with n indicating the number of items in each row and k indicating the number of items in each column.

Still further, the method of this invention involves placing an array or grouping of items in between successive flights of a continuously operable flight conveyor operating at a steady cycling rate, the grouping being comprised of columns and rows of items, there being n items in each row and k items in each column, where n is an integer greater than 1 and k is an integer greater than one. The items are randomly supplied by n supply means. The method comprises accumulating n backlogs of items, one backlog for each of the supply means, and releasing k items from each of the backlogs in timed relation to operation of the flight conveyor to form a column of items for the array. The columns of items are conveyed forward in timed relation to a respective pair of successive flights of the flight conveyor for placement of the columns of items between the respective flights.

The apparatus of this invention relates to apparatus for feeding items to means, such as a flight conveyor, continuously operable at a steady cycling rate with a predetermined grouping of items being placed on the means during a portion of each cycle thereof, this cycle portion being referred to as a window having a leading and a trailing boundary. The items are randomly received from a plurality of sources. The apparatus comprises means for accumulating a plurality of backlogs of items, one backlog for each source, and for releasing a selected number of items forward from each backlog during each cycle of the means to form the grouping. Means is provided for conveying forward the selected number of items forming the grouping in timed relation to the means and for placement of said selected number of items forming said grouping in a respective window.

Conveying apparatus of this invention feeds items one after the other to means which cycles continuously at a steady cycling rate with one or more items, constituting a selected number of items being placed in the means during each cycle thereof, each cycle having a portion or window thereof in which the item may be placed. The apparatus further has a plurality of means for randomly receiving items from a respective source, for accumulating a backlog of items, and for feeding the selected number of items forward for placement in a window of a respective cycle of the means. The apparatus further has means for initiating operation of one of the feeding means to feed out the selected number of items during each cycle of the means, for terminating operation of the feeding means after one or more cycles of the means, and for initiating operation of another of the feeding means to feed the selected number of items during each cycle of the means substantially without skipping placement of a selected number of items during a cycle of the means.

A flight conveyor of the present invention has a frame, two sets of pulleys on opposite sides of the frame and an endless, flexible belt trained about each said set of pulleys. Each said timing belt has a generally horizontal upper reach, a plurality of flights extending transversely between the timing belts at equal intervals therearound, means for clamping securing the flights of the timing belts, and a notch in each of the pulleys for receiving the clamping means as the belts travel around their respective sets of pulleys.

Still another method of this invention involves feeding items to apparatus, such as a flight conveyor, which cycles continuously at a steady cycling rate with one or more items, referred to as a selected number of items, being placed on the apparatus during a portion of each cycle thereof, the cycle portion being referred to as a window having a leading and a trailing boundary. The method comprises the steps of accumulating a backlog of randomly received items. A selected number of items is then fed forward from the backlog during each cycle of the apparatus at a feeding rate faster than the cycling rate of the apparatus so that each selected number of items is placed in its respective window progressively closer to the leading boundary thereof. The method further includes sensing when a selected number of items to be placed in a respective window will at least partially extend beyond the leading boundary of the window and then momentarily delaying feeding of the items from the backlog thereby to shift the next selected number of items toward the trailing boundary of its respective window.

Still another embodiment of the apparatus of this invention includes means for accumulating a backlog of randomly received items and for releasing a selected number of items forward from the backlog during each cycle of the flight conveyor. Means is provided for conveying forward the selected number of items in timed relation to the flight conveyor and for placement of the selected number of items on the flight conveyor in a respective window. The releasing means operates at a feeding rate faster than the cycling rate of the flight conveyor so that each selected number of items is placed in its respective window progressively closer to the leading boundary thereof than the proceeding selected number of items. The apparatus further includes means for driving the releasing means and means for sensing when a selected number of items to be placed in a respective window will at least partially extend beyond the leading boundary of its respective window and momentarily delaying the releasing means driving means thereby to shift the next to be placed selected number of items toward the trailing boundary of its respective window.

Other objects and features of this invention will be in part apparent and in part pointed out hereinafter.

BRIEF DESCRIPTION OF THE DRAWINGS

FIG. 1 is a plan view of apparatus of the present invention;

FIG. 2 is a side elevational view of the left side of the apparatus of FIG. 1;

FIGS. 9(a)-9(h) are diagrammatical representations illustrating a method of this invention of feeding items;

FIG. 10 is a plan view of the apparatus of this invention on a reduced scale illustrating one manner of supplying items to the feeding conveyors from a plurality of sources;

FIG. 12 is a diagrammatic representation of the speed-up and flight conveyors illustrating the method of this invention of feeding unit arrays of items for placement of a unit array on the flight conveyor upon each cycle thereof;

FIG. 13 (sheet 3) is an enlarged view of means for clampingly securing a flight bar to a flight conveyor timing belt.

Corresponding reference characters indicate corresponding parts throughout the several views of the drawings.

DESCRIPTION OF PREFERRED EMBODIMENTS

Figure 3:
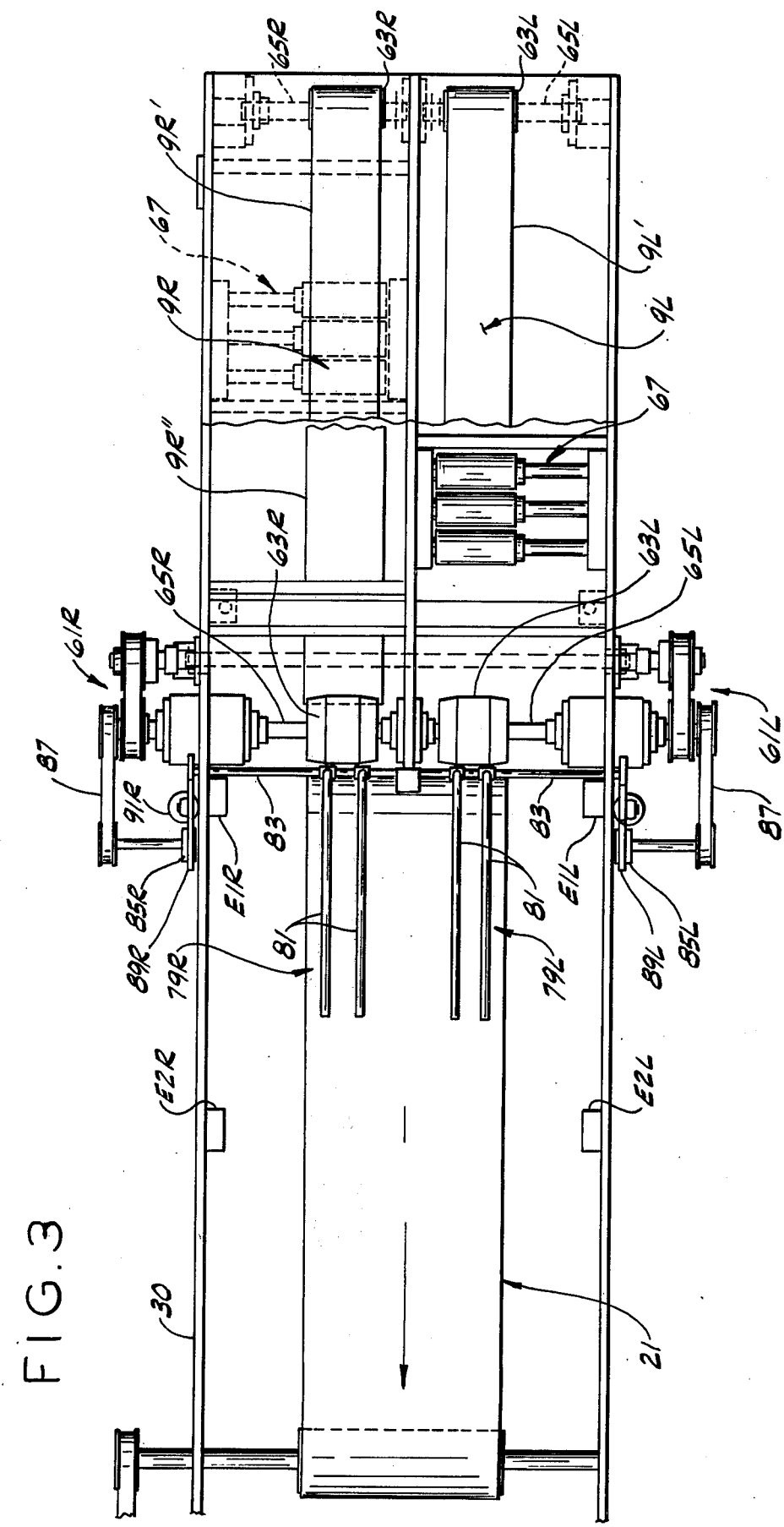
FIG. 3 is an enlarged plan view of a portion of the apparatus illustrating a pair of modulating feeding conveyors which randomly receive items, accumulate backlogs of items, and feed items forward from the backlogs, and illustrating an intermediate or speed-up conveyor.

Referring now to the drawings, apparatus of the present invention, indicates in its entirety at 1, is shown in FIGS. 1-8 for feeding items I one after the other to means, such as a flight conveyor 3, continuously operable at a steady cycling rate (e.g., R cycles per minute) with a selected number k or grouping G of items I being placed on the flight conveyor during each cycle thereof for being fed forward to apparatus, such as an overwrap machine generally indicated at 0. Flight conveyor 3 is shown to include a plurality of flights 5 spaced from one another a distance substantially greater than the length of the item (or items) placed thereon. With flight conveyor 3 operating at its continuous steady cycling rate R, a cycle of the flight conveyor is defined to be the time required for successive flights 5 to pass a stationary reference point. Each cycle of a flight conveyor has a portion thereof, referred to as a window W, during which time the selected number of items I may be placed on the flight conveyor without interference with the flights. Window W may vary in length depending on the spacing of flights 5 and the length of the selected number k of items to be placed. The window has a leading boundary $W_L$ defining the start of the period during which the window is open for placement of an item or items I on the flight conveyor and a trailing boundary $W_T$ defining the end of the above-mentioned period.

As generally indicated at 7, apparatus 1 further comprises means for randomly receiving items I from a respective supply of items, for accumulating one or more backlogs BL, BR, in which the items are in end-to-end abutting relation, and for feeding or releasing the items from the backlogs forward one at a time. As shown in FIGS. 1 and 3, feeding or releasing means 7 includes two side-by-side feeding or modulating conveyors 9R, 9L. These feeding conveyors are also referred to as feeding lanes and may be randomly supplied from independent sources, as shown in FIG. 10. Each of these feeding means comprises a pair of opposed endless conveyor belts including an upper belt 9R', 9L', and a lower belt 9R'', 9L''. The upper and lower belts are spaced from one another a distance slightly less than the thickness (i.e., the height) of items I so as to positively grip the items. These reaches move in the direction of the arrows shown in FIG. 7 at the same lineal speed so as to convey the items at the speed of the belts. The items are randomly received at the rear or entrance ends of feeding conveyors 9R, 9L, and the lineal speed of the feeding conveyors is such that backlogs BR and BL accumulate to the rear of the belts. The backlogs start, however, at the front or exit ends of feeding conveyors 9R, 9L. These opposed belts are driven in a manner as will appear at either a first feed rate $F_1$ faster than the cycling rate R of flight conveyor 3, or at a second rate $F_2$ slower than the cycling rate so that items I are progressively placed in their respective window W closer to a window boundary $W_L$ or $W_T$ than the preceding items. As is generally indicated at 11R, 11L (see FIG. 6), means is provided for shifting each of the feeding conveyors between its first and second feed rates. Other means, as generally indicated at 13R, 13L, is provided for sensing the placement of each item I on flight conveyor 3 relative to its respective window boundaries $W_L$, $W_T$ for effecting actuation of their respective shifting means 11R, 11L so as to shift feeding conveyors 9R, 9L between their first and second feed rates upon sensing when an item (or items) to be placed on the conveyor will extend at least partially beyond the leading or trailing boundary of its respective window W.

Figure 8:
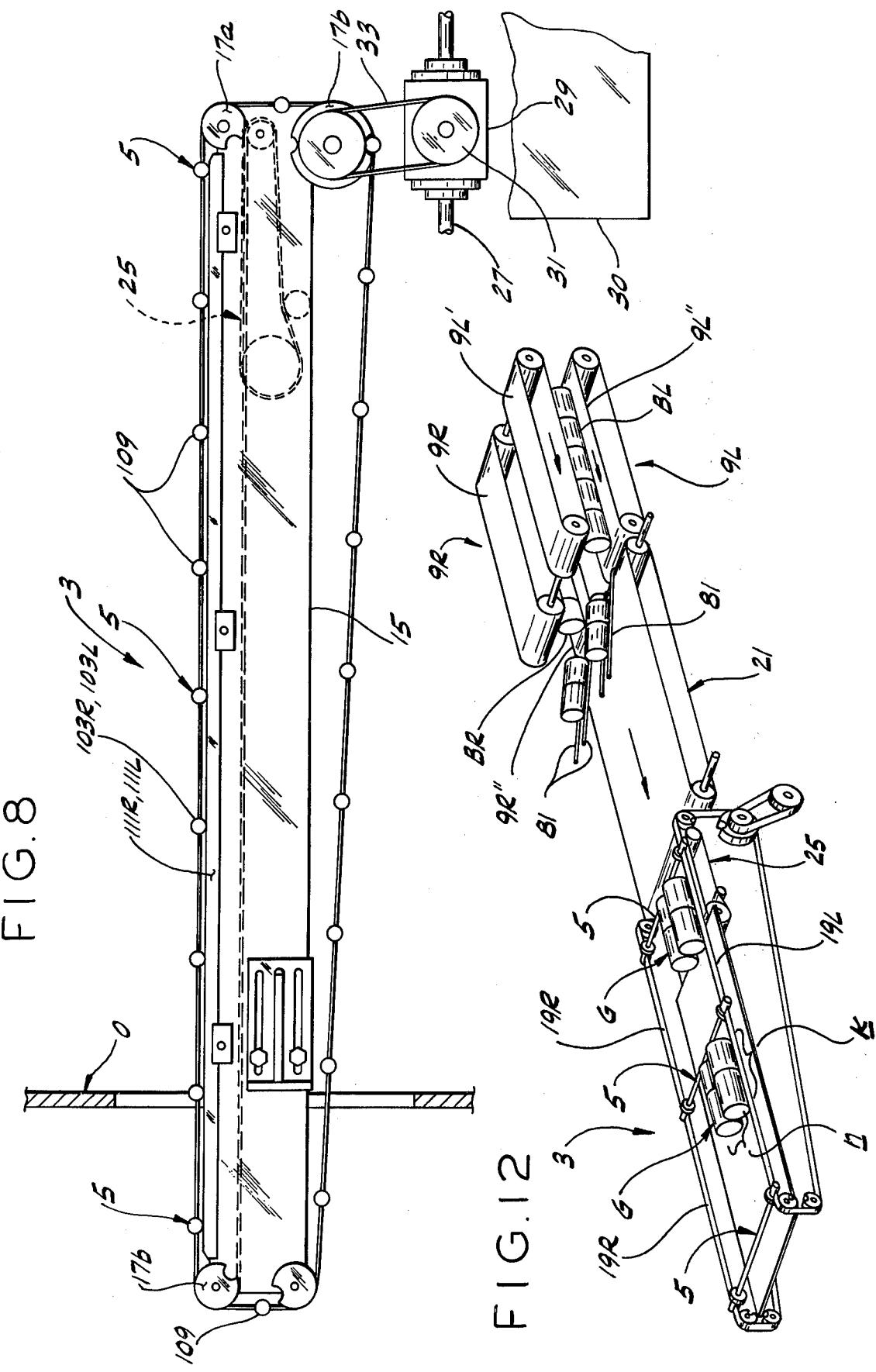
FIG. 8 is an enlarged left-side elevational view of the flight conveyor.

As is best shown in FIG. 8, flight conveyor 3 of this invention comprises a frame 15 on which two sets of pulleys 17a-17d, one set of pulleys on each side of the frame, are provided. Endless timing belts, 19R, 19L, are trained around respective sets of pulleys on each side of the frame. Each of these timing belts has a series of cogs or teeth 20 (see FIG. 13) on its inner face as is conventional and the pulleys have corresponding grooves (not shown) for reception of the belt cogs so as to prevent slippage of the belts relative to the pulleys. Flights 5 are equally spaced from one another around each of the timing belts. In the embodiment shown in the drawings, timing belts 19R, 19L are about 170 in. (430 cm.) long and the flights are equally spaced at intervals of approximately 34 in. (86 cm.) for accommodating items I such as rolls of paper towels 11 in. (28 cm.) long or rolls of toilet tissue 4.6 in. (11.7 cm.) long. The spacing of flights 5 will also accommodate placement of a grouping G of items, such as multiple rolls of toilet tissue as is shown in FIG. 12. It will be understood that a grouping G may include one, two or more items I.

As heretofore mentioned, flight conveyor 3 cycles at a steady rate R and feeding conveyors 9R, 9L each operate at either a first feed rate $F_1$ or a second feed rate $F_2$, with the first rate being somewhat faster than the cycling rate R of the flight conveyor, and with the second rate being somewhat slower than the cycling rate. For example, cycling rate R of the flight conveyor may be 160 cycles per min., the first feed rate $F_1$ may correspond to the feeding of a selected number k=163 of items per min. and the second feed rate $F_2$ may correspond to the feeding of a selected number K=157 of items per min. If, for example, single rolls of paper towels are being conveyed and placed in each window, the lineal speed of feeding conveyors 9R, 9L may be about 149 ft. per min. (46 m. per min.) when the feeding conveyor is operated at its first rate $F_1$, and about 144 ft. per min. (44 m. per min.) when operated at its second feed rate $F_2$. Since flight conveyor 3 is operated at a steady cycling rate of 160 cycles per minute, its lineal speed is about 453 t. per min. (138 m. per min.). The above-noted lineal speeds of the various conveyors and the cycling rate of the flight conveyor are only for purposes of illustration.

It will be understood that the apparatus of this invention may be operated at different rates from those described above, and the relative speeds of the conveyors may differ significantly.

Apparatus 1 of the present invention further comprises an intermediate or speed-up conveyor 21 for conveying items I from the outlet end of feeding conveyors 9R, 9L to the entrance and of flight conveyor 3. Speed up conveyor 21 is an endless-belt conveyor which operates continuously at a lineal speed greater than the lineal speed of the feeding conveyors so that upon release of an item by the feeding conveyors from their respective backlogs BR or BL (in which the items are in end-to-end abutting relation), a gap is formed between successive items which are released. For example, the lineal speed of conveyor 21 may be about 360 ft./min. (109.9 m./min.).

Each sensing means 13R, 13L comprises a pair of electric eyes E1R, E2L spaced from one another along the path of items I which are conveyed from backlog BR or BL to flight conveyor 3. Electric eyes E1R and E1L are shown to be positioned adjacent the outlet end of their respective feeding conveyors 9R, 9L for sensing an item I before it is released by its feeding conveyor for being conveyed forward by speed-up conveyor 21. Eyes E2R, E2L are spaced along the speed-up conveyor to detect the position of an item being conveyed by the speed-up conveyor relative to the position of flights 5 on flight conveyor 3. It will be understood that sensing means 13R, 13L may include other components, such as limit switches LS5, LS6 and LS7, as will be hereinafter disclosed. As will be explained in greater detail hereinafter, with apparatus 1 in operation (i.e., not in its start-up mode) and with a steady backlog of items I accumulated by each of the feeding conveyors 9R, 9L, the feeding conveyors will operate at one of their feed rates $F_1$ or $F_2$ until such time that eyes E2R, E2L detect that an item fed forward by its respective feeding conveyor will be placed on the flight conveyor with at least some portion of the items extending beyond a boundary $W_L$ or $W_T$ of its window W. When this condition is sensed, a signal will be generated to effect activation of respective shifting means 11R, 11L thereby to shift the respective feeding conveyors from one feeding rate to its other feeding rate. Eyes E1R, E1L sense that items to be released are in end-to-end abutting relating relation or that the gap between successive items is within prescribed limits. If the above-noted backlog conditions are not maintained, termination of items from the respective feeding conveyor will be effected. Other electric eyes E3R, E3L near the entrance end of feeding conveyors 9R, 9L, respectively, may optionally be provided to sense the state of the backlogs BR or BL accumulated by their respective feeding conveyors. Eyes E3R and E3L and their associated circuitry generate signals which prevent feeding of items I by their respective feeding conveyors when their respective backlog BR or BL is below a predetermined state (i.e., when the backlog is less than desired length or has less than a desired number of items therein). Thus, eyes E3R and E3L constitute item sensing means for ensuring that backlogs BR and BL contain above a predetermined number of items. It will be understood that signals generated from either eye E3L or E3R can prevent feeding from both feeding conveyors 9L, 9R. Eyes E3R, E3L can, of course, be moved toward or away from the entrance end of their respective feeding conveyors so as to vary the predetermined state of the backlogs which they monitor.

Figure 4:
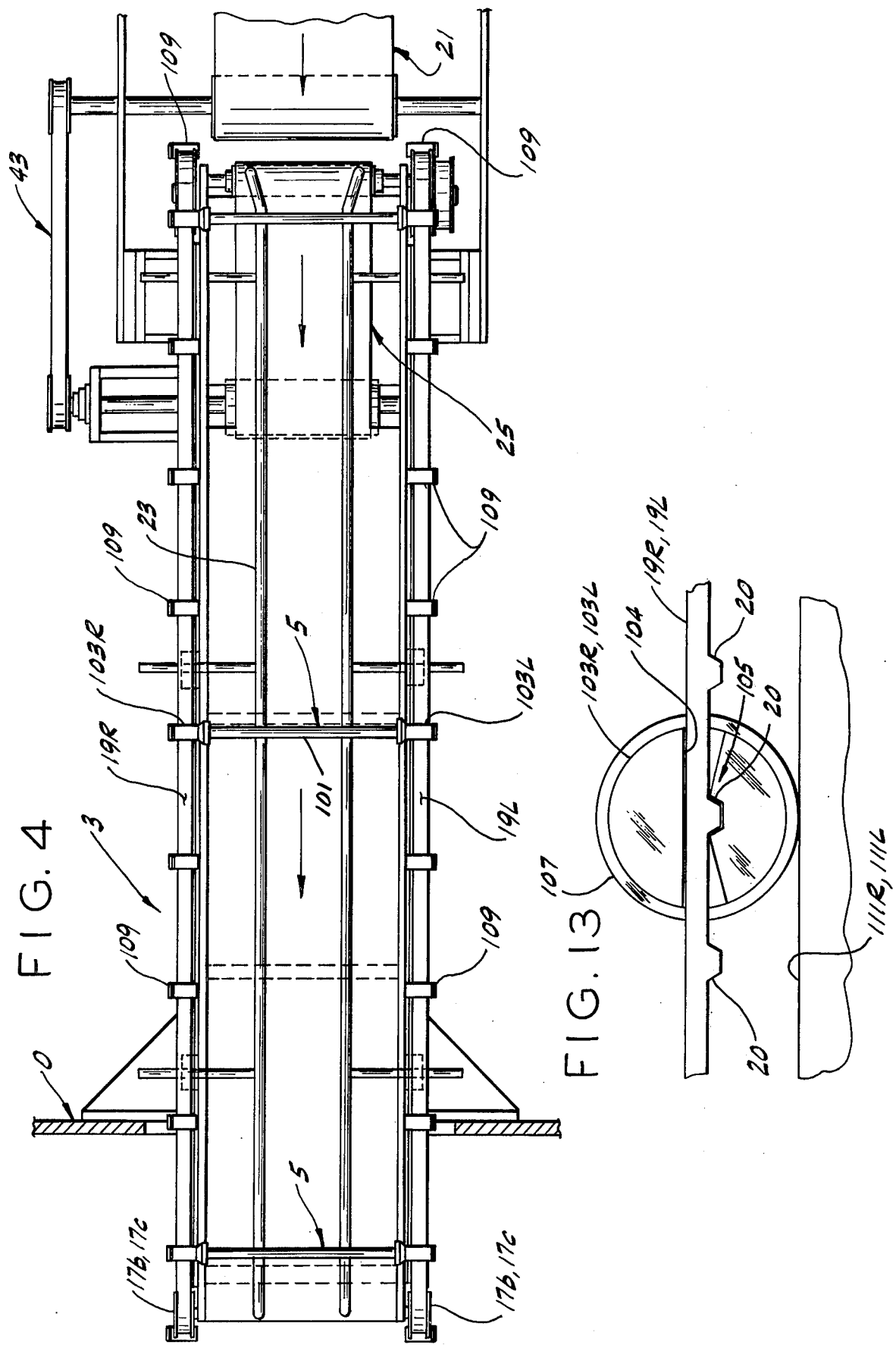
FIG. 4 is an enlarged plan view of a flight conveyor of this invention which receives items from the feeding conveyors and which conveys the items to a continuously operable machine, such as an overwrap machine.

As shown in FIGS. 1 and 4, flight conveyor 3 further includes item guide bars 23 carried by frame 15. These guide bars are adjustable toward and away from the center of the flight conveyor and are spaced below the level of the upper reaches of timing belts 19R, 19L and flights 5 and are spaced apart so as to engage items I and to guide them along a desired path as they are conveyed along the flight conveyor.

Flight conveyor 3 is optionally provided with a transition belt conveyor 25 at its entrance end for receiving items I from speed-up conveyor 21 and for conveying these items at least part way along the length of the flight conveyor so that the item is forward of the next flight 5 as the flight moves vertically between pulleys 17d and 17a of the sets of pulleys at the opposite sides of the flight conveyor. Thus, transition conveyor 25 insures that the flights engage the rear or trailing ends of the items rather than their bottom faces.

As described herein, flight conveyor 3 is utilized to feed items I into overwrap machine 0 in timed relation to the operating or cycling rate of the overwrap machine. Flight conveyor 3 is driven by the overwrap machine so as to insure that the flight conveyor is operated in precise timed relation with the cycling rate of the overwrap machine. It will be understood that upon a flight bar 5 engaging an item I or a grouping G placed within a window W of the flight conveyor, the item or grouping will be conveyed forward into the overwrap machine in precise timed relation by the flight conveyor. It will further be understood that it is the flight bars themselves which precisely convey the items and it is not necessary for the conveying apparatus 1 of this invention to place the items on the conveyor belt of the flight conveyor in precise timed relation therewith.

Figure 5:
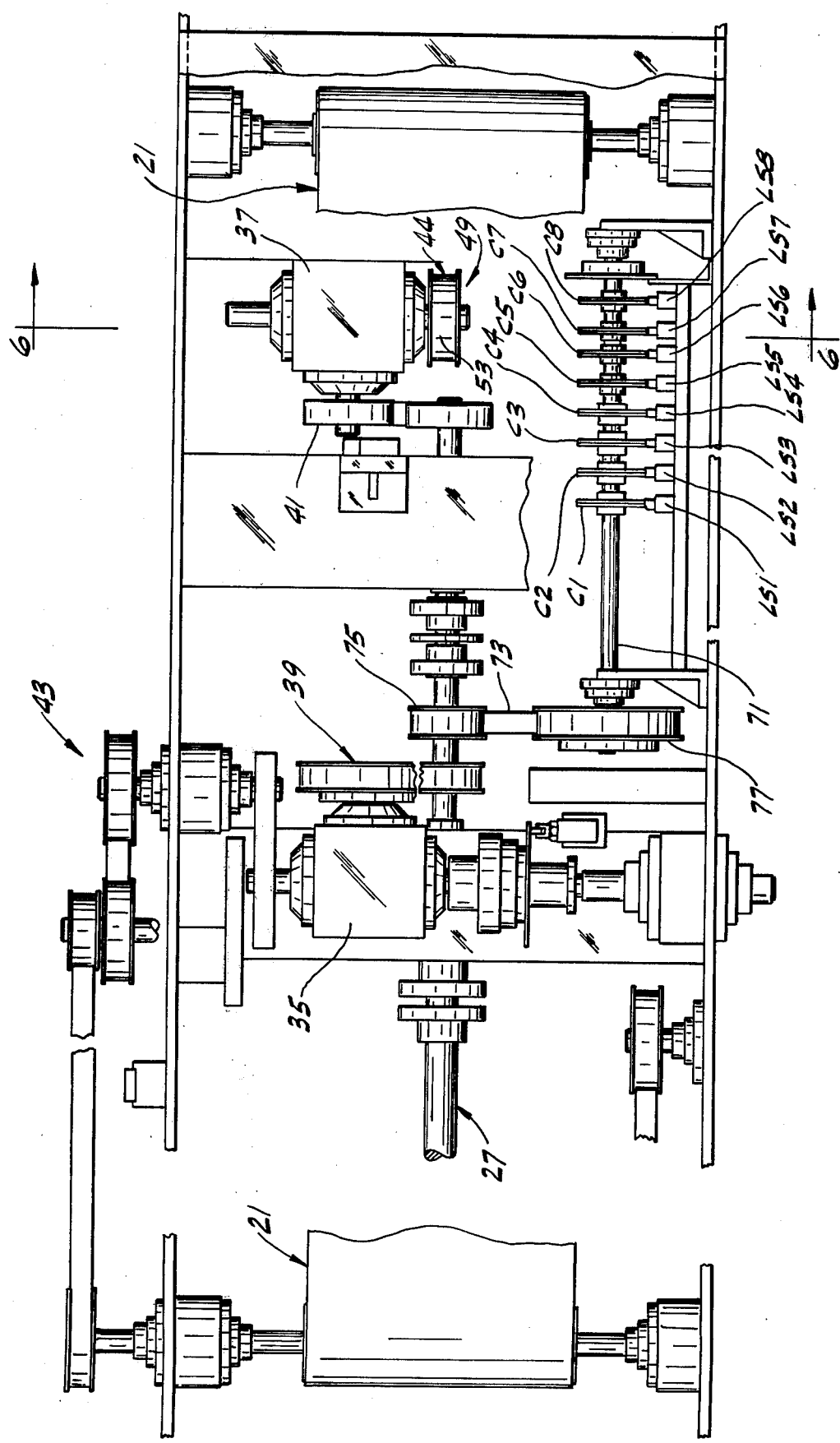
FIG. 5 is a plan view of the speed-up conveyor with certain parts omitted to illustrate the drive for the apparatus.

For convenience, flight conveyor 3, intermediate conveyor 21, transition conveyor 25 and feeding conveyors 9R, 9L are driven by the overwrap machine drive in a manner as will appear. With apparatus 1 and flight conveyor 3 driven by the overwrap machine, the speeds of the flight conveyor 3, intermediate conveyor 21 and feeding conveyors 9L, 9R will remain proportioned to one another as the speed of the overwrap machine varies. It will be understood that the overwrap machine 0 may be operated at different speeds in its normal operation. By stating that the flight convyor operates steadily and continuously it is meant that the speed of the flight conveyor is not varied for the purpose of placement of items I or groups G in their respective windows W and that in normal operation, the flight conveyor does operate at a steady speed. It will, however, be understood that other suitable drive arrangements could serve equally as well. An elongate drive shaft 27 (see FIG. 8) transmits power from the overwrap machine drive to the various conveyors. More particularly, drive shaft 27 is connected to the input shaft of a first gear box 29 (referred to as the flight conveyor gear box) which is carried by flight conveyor frame 15. The other components of the drive for the feeding conveyors and the speed-up conveyor are carried by a main frame 30. The output of the flight conveyor gear box drives a pulley 31 which in turn drives pulley 17b of the flight conveyor via a belt 33 so as to drive the flight conveyor timing belts 19R, 19L. As shown in FIG. 5, the drive shaft, after continuing through gear box 29, drives other gear boxes 35 and 37 via drive belt and pulley arrangements 39 and 41, respectively. Gear box 35 drives intermediate conveyor 21 and transition conveyor 25 via a timing belt and pulley arrangement generally indicated at 43. The output shaft of gear box 37 drives both feeding conveyors 9R, 9L via a common belt and pulley arrangement 44 which in turn drives two other belt and pulley arrangements generally indicated at 45R, 45L (see FIG. 6). These last-mentioned belt and pulley arrangements each include a respective two electric brake clutch coupling units 47R or 47L, such as are commercially available from the Wagner Electric Clutch and Brake Company of Beloit, Wisconsin under their trade designation models PD500 and SF500, which constitute feed rate shifting means 11R, 11L for feeding conveyors 9R, 9L.

It is to be understood that each pair of opposed belts of the feeding conveyors 9R, 9L has its own respective sensing means 13R, 13L and shift means 11R, 11L so that each pair of feeding belts may be operated independently of one another. Alternatively, both of the feeding conveyors could be slaved together so as to operate in unison. In the following description of the drive of feeding conveyors 9R, 9L, only the drive 45L for feeding conveyor 9L will be described in detail, since the drives for both of these feeding conveyors are identical.

Figure 6:
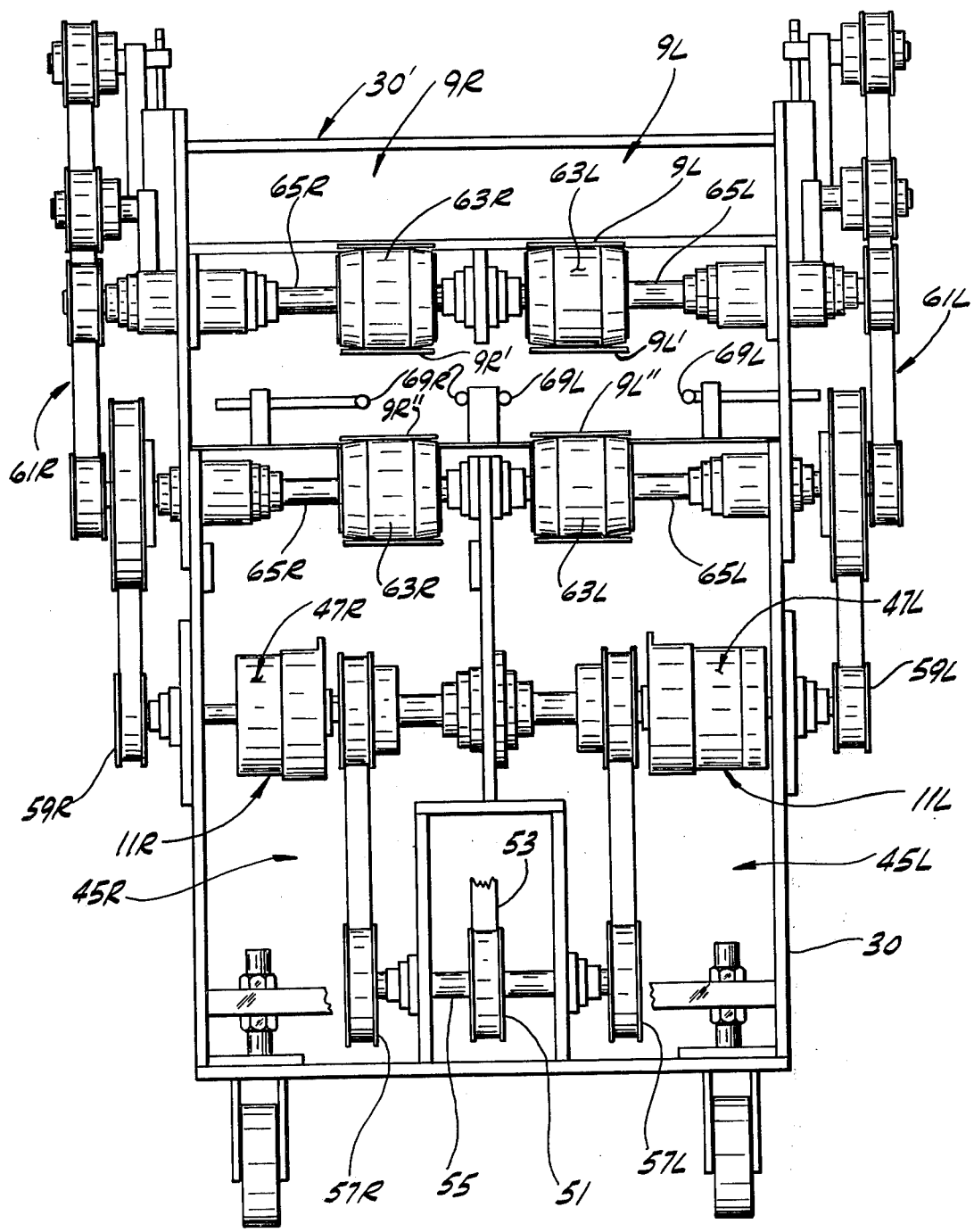
FIG. 6 is a vertical section taken along line 6—6 of FIG. 5 further illustrating the drive.

As shown in FIG. 5, drive 44 includes a pulley 49 fixed on the output shaft of gear box 37 which drives another pulley 51 via a timing belt 53 (see FIG. 6). Pulley 51 is fixed to a shaft 55 journaled to frame 30 of the conveyor apparatus and pulleys 57R, 57L are fixed thereon to drive respective feeding conveyors 9R, 9L via their respective drive clutches 47R, 47L. Electric clutch brake units, 47L, 47R, each includes a first electric clutch 47Ra, 47La (see FIG. 11) which when energized causes its respective feeding conveyor 9R, 9L to be driven at its slower feed rate $F_2$ and a second electric clutch 47Rb, 47Lb which when energized causes its respective feeding conveyor to be driven at its faster feed rate $F_1$, and an electric brake 47Rc, 47Lc which when energized stops its respective feed conveyor 9R, 9L.

Figure 7:
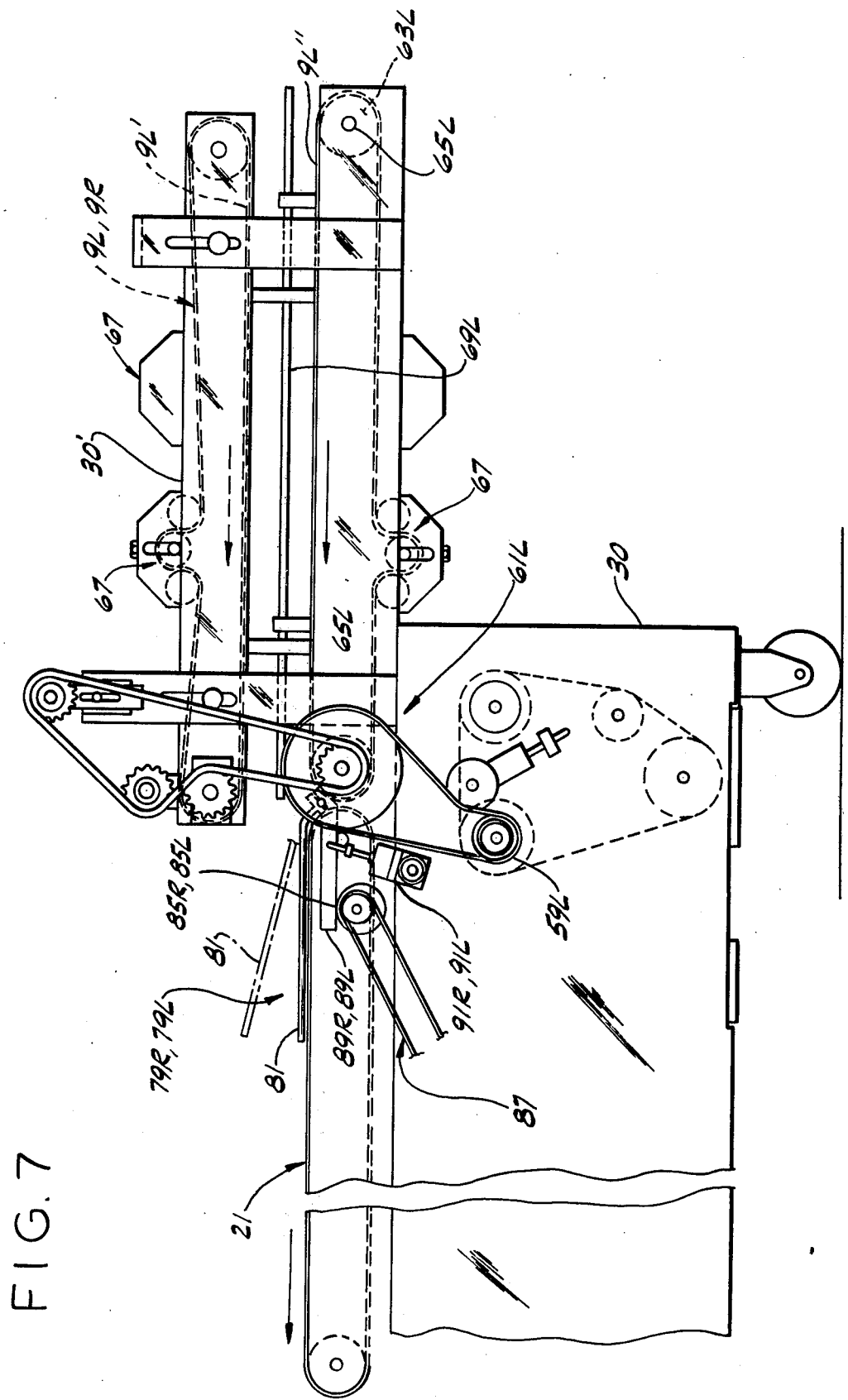
FIG. 7 is an enlarged left side elevational view of the feeding and speed-up conveyors.

The output shaft of clutch units 47L, 47R carry respective drive pulleys 59R, 59L, which in turn drive their respective feeding conveyors 9R, 9L via respective timing belt and pulley arrangements generally indicated at 61R, 61L. A detailed description of these timing belt and pulley arrangements is not deemed necessary because their construction and operation is readily apparent from FIGS. 6 and 7. It is manifest that these belt and pulley arrangements drive their respective feeding conveyors in such direction and speed that the lower reaches of belts 9R", 9L", and the upper reaches of belt 9R" and 9L" move in the same direction and at the same lineal speed such that items gripped by the belts are uniformly conveyed thereby. As is shown in FIGS. 6 and 7, belts 9R', 9R" are each trained around respective rollers 63R fixed on shafts 65R journaled to the conveyor frame and belts 9L' and 9L" are trained around similar rollers 63L fixed on shafts 65L journaled on the frame. Rollers 63R, 63L are axially slidable along their respective shafts 65R, 65L so as to vary their position relative to conveyor frame 30. The upper shafts 65R and 65L are mounted on a movable portion of the conveyor frame, as indicated at 30' which is adjustable vertically within a limited range so as to vary the vertical spacing between each pair of belts 9L', 9L" and 9R', 9R" thus enabling the apparatus of this invention to accommodate items of different heights or thicknesses. As shown in FIGS. 2 and 7, belt and pulley drive arrangements 61R, 61L are so constructed as to accommodate vertical movement of the upper frame portion 30'. Each of these feeding conveyor belts is tensioned by means of rollers, as is generally indicated at 67 (see FIG. 3). Adjustable guides 69R, 69L (see FIG. 6) are provided for guiding items I as they are fed into and as the items are conveyed along by feeding conveyors 9R, 9L.

Referring now to FIG. 5, a series of cam operated switches, as indicated at LS1–LS8, is shown to be operated by respective rotary cams C1–C8 fixed on and rotatable with a cam shaft 71. The latter is driven by a timing belt 73 trained around a pulley 75 fixed on drive shaft 27 and a pulley 77 fixed on cam shaft 71 at such a rate so that the cams rotate one revolution for each cycle of the flight conveyor. The operation and function of these switches will be hereinafter explained in reference to FIG. 11.

Apparatus 1 of this invention is operable for feeding either a grouping G of items (including a single item) forward in timed relation to flights 5 of flight conveyor 3 for placement of either a single item or other grouping of items between successive flights of a flight conveyor. As shown in FIG. 12, grouping G of items I is comprised of a plurality of side-by-side columns of items I extending transversely to the direction of travel of the conveyors or items. In other words, a grouping of items I is arranged in columns and rows with n representing the number of columns (or the number of items in each row) and with k representing the number of items in each column.

Figure 11:
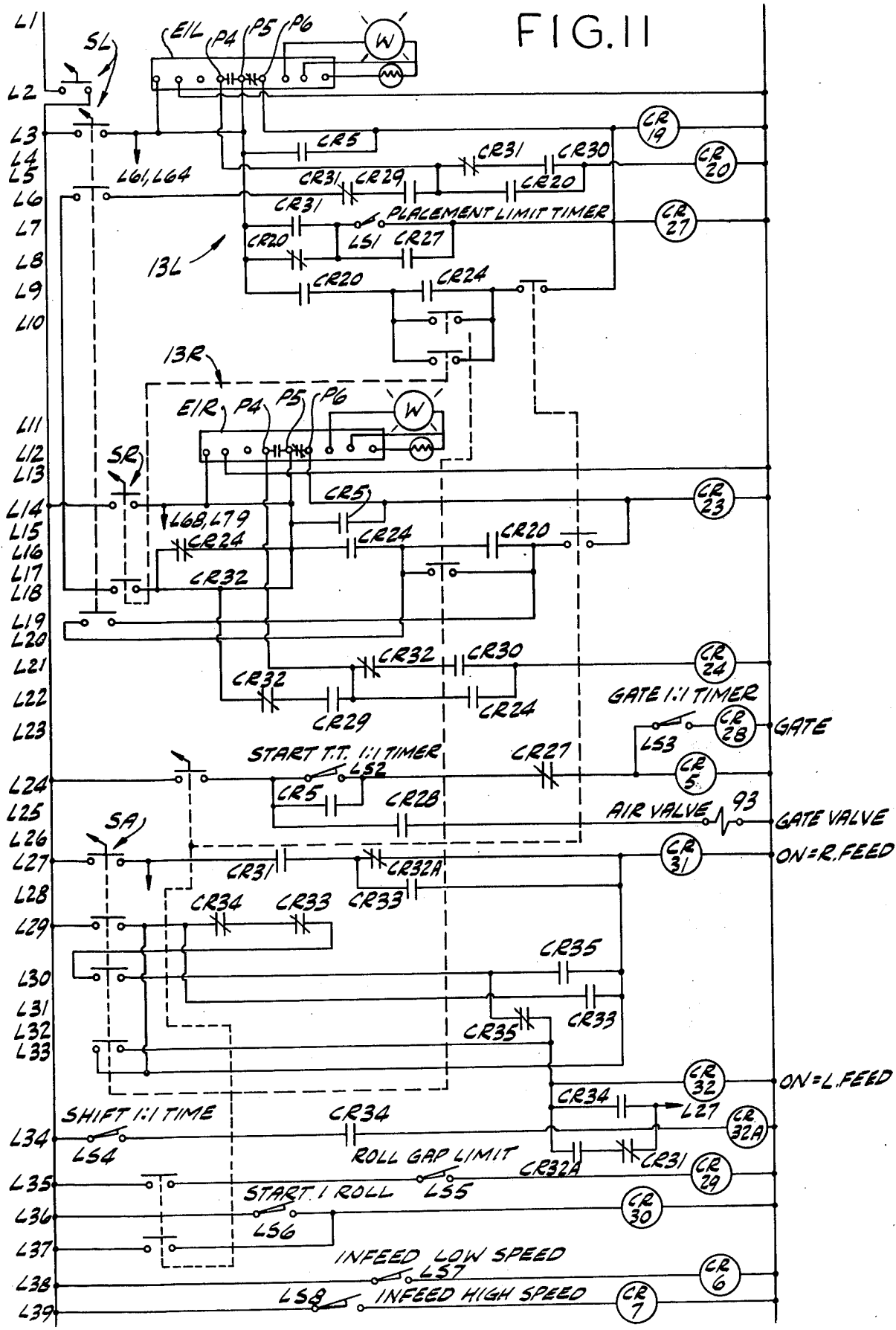
FIG. 11 is an electrical schematic disclosing a control system for the apparatus of the present invention.

As is generally indicated at 79R, 79L, in FIGS. 1, 2, 3 and 7, means is provided for accumulating or holding back one or more items (i.e., a selected number of items) I fed forward from each respective backlog BR, BL so as to form a column of items, and for releasing the formed columns of items as a unit to be fed forward by intermediate or speed-up conveyor 21. Thus, the entire column is fed forward for placement within a respective window W of the flight conveyor 3. Each accumulating means 79R, 79L is shown to comprise a pair of spaced rods 81 cantilevered from a horizontal shaft 83 pivotally supported by frame 30 with the pivot shaft extending transversely of the respective feed conveyors 9R, 9L at the outlet ends thereof below the level of the items fed forward from the feeding conveyors with rods 81 extending in the direction of feed of the items. Rods 81 are preferably spaced apart from one another a distance somewhat less than the width of the items and are preferably of a length somewhat greater than that of the items to be accumulated therein to form a column. Pivot shaft 83 and rods 81 for each means 79R, 79L are movable as a unit from a lowered retracted position (as shown in solid lines in FIG. 7) in which rods 81 are horizontal and contiguous to the upper surface of conveyor 21 and in which items I supported on the rods are in frictional engagement with conveyor 21 for being conveyed by the conveyor and a raised position (as shown in phantom) in which items are fed forward by feeding conveyors 9R, 9L are held by the rods clear of the speed-up conveyor and hence constitute means for releasing the items accumulated thereon so that the items released remain in substantially end-to-end abutting relationship one with another. The rods are moved between their stated raised and lowered positions by means of respective rotary cams 85R, 85L (see FIG. 7) driven in timed relation to the cycling rate R of flight conveyor 3 via a belt and pulley arrangement drive 87. Each item accumulating means includes a bell crank 89R or 89L rigidly connected to its respective pivot shaft 83, the bell crank constituting a cam follower in engagement with the cam surfaces of rotary cams 85R, 85L. Thus, upon operation of these cams, the rods are raised and lowered in precise timed relation to each cycle of the apparatus. Air cylinders 91R, 91L are interconnected between frame 30 and bell crank members 89R, 89L. When extended, air cylinders 91R, 91L hold their rods in their raised position thereby to prevent the rods from moving in accordance with their respective cams. Air cylinders 91R, 91L are controlled by solenoid operated air valves 93, as shown in FIG. 11. With the rods 81 in their raised position, a column of items I of a selected number of items, for example k items, can be readily accumulated on the rods and the accumulated items can be released to travel toward flight conveyor 3 in timed relation to their respective windows W and the items are placed on the flight conveyor substantially without a gap between adjacent items in the column upon movement of rods 81 from their raised accumulating position to their lowered position in which the items accumulated thereon are in frictional engagement with speed-up conveyor 21.

Referring now to FIG. 11, the control system for apparatus 1 of this invention and for carrying out the methods of this invention is schematically disclosed. Generally recognized electrical symbols are used in FIG. 11 to represent conventional electrical components. While it is believed that those skilled in the art will readily understand the construction and operation of this control system from the schematic representation shown in FIG. 11, the more important features of the control system and various aspects of its operation will hereinafter be discussed.

Briefly, the control system includes duplicate controls for the left feeding conveyor 9L, as is shown in lines L2–L10 of FIG. 11 and is generally indicated at 13L, and for the right feed conveyor 9R, as shown in lines L11–L22 and as generally indicated at 13R. The circuitry shown in lines L23–L26 controls operation of item or column accumulator means 79R, 79L, and the circuitry shown in lines L27–L34 controls alternate feeding of one or more items from either of the feeding conveyors. In line L42, a timed delay relay TDR is shown which, in one mode of operation, controls feeding of items from one conveyor or the other for a predetermined time interval (i.e., of the time interval of the time delay relay) and then automatically terminates feeding from one feed conveyor and initiates feeding of items from the other feed conveyor so as to maintain a balance between backogs BL and BR. The circuitry for controlling operation of clutch brake units 47L, 47R is shown in lines L50–L59. The circuitry shown in lines L60–L66 and in lines L67–L72 control modulation of the right and left feed conveyors 9R, 9L between their respective first (or fast) and second (slow) feed rate $F_1$ and $F_2$, respectively. Finally, the circuitry shown in lines L73–L75 and at lines L77–L79 of FIG. 11 including electric eyes E3L, E3R, respectively sense the state of backlogs BL and BR.

As previously mentioned, electric clutches 47R, 47L are electric brake clutch coupling units each having a low-speed clutch 47Ra, 47La, and high-speed clutch 47Rb, 47Lb, and an electric brake 47Rc, 47Lc. By activating the various clutch coils as shown in FIG. 11, each conveyor 9R, 9L may be operated independently of one another at either of its feed rates $F_1$, $F_2$ or may be braked to a stop.

Operation of apparatus 1 will be hereinafter described so as to feed items I from only one of the feeding conveyors, such as 9L. Of course, operation of the other feeding conveyor 9R will be similar. To start operation of feeding conveyor 9L, switch SL (see line L3 of FIG. 11) is turned on. Assuming that no item is blocking eye E1L, the coil of relay CR19 (see line L3) is energized, thus closing its normally open contact CR19 in line L54 so as to energize the slow-speed clutch 47La of clutch 47L. Thus, feeding conveyor 9L will be driven at its slow feed rate $F_2$ and will convey an item toward eye E1L. Upon the item being conveyed forward actuating eye E1L, the contacts between pins P5 and P6 of eye E1L (see line L2) open and thus deenergize the coil of relay CR19 which in turn opens its normally closed contacts in line L54 and deenergizes both the high and low speed clutches 47La, 47Lb of clutch 47L and energizes its brake 47Lc so as to stop feeding conveyor 9L. Upon the roll start switch LS6 (see line L36) being closed by its respective rotary cam C6, the coil of relay CR30 is energized. The closing of contact CR30 in line L5 energizes the coil of relay CR20 and its normally open contacts in line L9 close which in turn reenergize the coil of relay CR19. Thus, conveyor 9L will be again driven forward at its slow feed rate $F_2$. As each item I is conveyed away from the exit end of feeding conveyor 9L by speed-up conveyor 21, a gap will develop between the item being conveyed away and the next item in backlog BL. The gap causes eye E1L to momentarily remake. While relay CR19 would normally be opened upon the remaking of eye E1L, a so-called roll-gap limit switch LS5 in line L35 actuated by its respective cam C5 energizes the coil of relay CR29 so that its normally open contacts CR29 in line L6 close thereby providing power to the coil of relay CR20 and preventing relay CR19 from being deenergized upon the remaking of eye E1L. Switch LS5 will remain closed for a time determined by the profile of its actuating cam C5. Upon opening of switch LS5, relay CR29 is deenergized. If by the time CR29 is deenergized, however, the next item to be conveyed forward blocks eye E1L, coil CR19 will remain energized and feeding conveyor 9L will remain in motion. If eye E1L is not blocked upon the deenergization of relay CR29, relay CR19 will be deenergized thus stopping operation of the feeding conveyor. It can thus be seen that by varying the length of time that the roll-gap limit switch LS5 remains closed, the gap or spacing between successive items in backlog BL can be readily varied.

As shown in lines L38 and L39, respectively, cam-operated limit switches LS7 and LS8 are provided which respectively energize the coils of relay CR6 and CR7. Switches LS7 and LS8 are actuated by respective cams C7 and C8 on camshaft 71, which, as previously mentioned, is driven by the drive of the conveyor system through one revolution for each cycle of flight conveyor 3.

With feeding conveyor 9L operating at its slower feed rate $F_2$, it will continue to operate at its slow feed rate as long as an item I fed forward by the feeding conveyor blocks electric eye E2L before cam C7 actuates switch LS7 and pulses its respective relay CR6. In lines L63 and L64 it will be noted that when an item blocks eye E2L and when contact CR6 is closed, the coil of relay CR21 is energized and its latching contact in line C63 is closed thereby to hold its coil energized after relay CR6 is deenergized so as to maintain energization of the slow-speed clutch 47La via the closed contact CR19 and the normally closed contact CR22. However, upon eye E2L being unblocked cam 8 actuates switch LS8 to pulse relay CR7 and to close contacts CR7 in line L65. Thus eye energizes the coil of relay CR22. Energization of the latter opens its normally closed contact CR22 in line L63 and thus deenergizes the coil of relay CR21, opens the normally closed contact of relay CR22 in line L54 so as to deenergize slow-speed clutch 47La and closes the normally open contact CR22 in line L55 so as to energize the high-speed clutch 47Lb to drive the feeding conveyor 9L at its high-speed rate $F_1$. Relay CR22 is latched via its contacts in line L66. Thus, the feeding conveyor 9L will continue to be driven at its higher feed rate placing items I in their respective windows W progressively closer to the leading boundary $W_L$ of window W until such time as an item blocks eye E2L when relay CR6 is pulsed thus energizing relay CR21. It is therefore seen that the actuation of switches LS7 and LS8 determines the leading and trailing boundaries $W_L$ and $W_T$, respectively, of window W.

It will be understood that the modulation of feeding conveyor 9R between its fast and slow feed rates is effected in essentially the same manner as described above by switches LS7 and LS8 via relays CR25 and CR26 when switch SR is turned to its on position.

If it is desired to alternate feeding of one or more items I from one feeding conveyor 9R or 9L and then the other, switch SA in line L27 is turned to its on position. This in turn energizes the coil of relay CR31 via line L33. Relay CR31, when energized, effects feeding of items I only from the right feeding conveyor 9R. Items will be fed from the right conveyor until such time as time-delay relay TDR times out thereby deenergizing the coil of relay CR35. This in turn drops out relay CR31 and powers up relay CR32 to initiate feeding from the left conveyor 9L. If, however, the items I in one of the backlogs BL, BR decreases to the point where its respective backlog sensing eye E3R or E3L is unblocked, its respective relay CR33 or CR34 becomes energized and thus prevents its respective feeding conveyor from feeding items when the time-delay relay would normally have initiated operation of that feeding conveyor.

Now that apparatus 1 and the control system for the apparatus of this invention have been disclosed in detail, the methods of this invention will now be described. Briefly, the method of this method involves feeding items I one after the other to apparatus, such as to flight conveyor 3, which cycles continuously at a steady rate (e.g., at R cycles per minute) with an item I (or a grouping G of items) being fed to the flight conveyor during a portion of each cycle thereof (i.e., during the availability of window W) with the items being randomly delivered from a plurality of item supplies or sources (e.g., a log saw) at respective average rates $r_R$ and $r_L$. A feeding lane 9R, 9L is provided for each item source and a backlog BR or BL of items is accumulated as they are received from each of the item sources. In the apparatus of the present invention this step of accumulating backlogs is accomplished by a feeding conveyor 9R, 9L which positively grip one or more of the items between their respective belts 9L', 9L'' and 9R', 9R'' so as to hold back the items next received and to allow successive randomly received items on supply conveyors 92L, 92R to come into engagement with the trailing ends of the gripped items. As is best shown in FIG. 10, the item supplies may be located at widely separate locations and the items may be conveyed to the ends of the feeding conveyors via supply conveyors 92R, 92L. In other instances, the supply of items may be located relatively close to the entrance end of the feeding conveyors. Preferably, supply conveyors 92R, 92L are driven at a lineal speed faster than the lineal speed of the belts of feeding conveyor 9L, 9R so as to form backlogs BR, BL. It will be understood that the average rate at which supply conveyors 92R, 92L supply the items is generally equal to the rate at which the feeding conveyors feed the items forward. Backlogs BR and BL which are accumulated behind each of the feeding conveyors thus compensate for any short-term irregularities in the random delivery of items from the supply conveyors to feed items forward continuously at a substantially steady rate. Each feeding conveyor 9R, 9L is operable to feed forward a selected number k of items on each cycle of flight conveyor 3 so as to place a group of k·n items in each window W.

The method of this invention further comprises releasing items I (or a grouping G of items) one at a time from backlogs BR or BL and conveying the item or grouping forward for placement on flight conveyor 3 within a respective window W in timed relation to the flight conveyor. In apparatus 1 items are released as a respective feeding conveyor 9R or 9L feeds an item forward from its exit end. Alternatively, several items can be released from a backlog and accumulated on rods 81 so as to form a grouping G. Either a single item released by the feeding conveyors or a grouping of items accumulated by rods 81 are then released in timed relation to the cycling rate of the flight conveyor for placement in a window W either at a first feed rate $F_1$ which is slightly faster than the cycling rate R or at a second feed rate $F_2$ slightly slower than the cycling rate of the flight conveyor, so that each item (or grouping of items) is placed in its respective window W progressively closer to one boundary $W_L$ or $W_T$ of the window than the preceding item. When the apparatus 1 of the present invention is operated to form and convey grouping G of items, clutches 47R and 47L simultaneously drive their respective feeding conveyors 9R and 9L at their first or second feed rates independently of one another. It will also be understood that since accumulating rods 81 are driven in timed relation to flight conveyor 3, these rods are moved between their receiving and release positions in 1:1 relation with the cycling rate R at which the flight conveyor is driven. On each cycle of the flight conveyor, rods 81 are maintained in their raised receiving positions for a time sufficient to accumulate a selected number k of items and is momentarily lowered to release the items accumulated thereon. The items are instantaneously carried away by conveyor 21 and the rods are returned to their raised positions to receive the next item fed from its feeding conveyor on the next cycle. Thus, the operation of the feeding conveyors need not stop.

The method of this invention still further involves sensing when an item I or a group G to be placed in a window W of the flight conveyor conveyed at one feed rate (i.e., at either $F_1$ of $F_2$) will at least partially extent beyond one boundary (either the leading or trailing boundary $W_L$ or $W_T$ or window W) and effecting the release of items from the backlog at the other feed rate so that each item is placed in its respective window progressively closer to the opposite boundary of its window than the preceding item.

This method is semidiagrammatically illustrated in FIG. 9. As can be seen, window W is between successive flights 5 of flight conveyor 3 and extends from the forward end of a group of items engaging the trailing flight bar to the leading flight bar. For purposes of explanation, assume the first group to be placed, designated G1, is placed adjacent the trailing boundary, $W_T$, of the window and assume the feeding conveyor 9R or 9L is being operated at its fast feed rate $F_1$. The next successive group (e.g., items G2–G4) are released and fed forward by the feeding conveyor and are placed in their respective windows progressively closer to the leading boundary $W_L$ of their respective windows than the preceding group. At some point in time, however, sensing means 13L, 13R (i.e., electric eye E2R or E2L) will sense that a group to be placed in its window will extend at least partly beyond the leading boundary of its window. In practical terms, this means that if the group is not placed in its respective window, it will overlie a front flight bar 5. This interference with the flight bar is, of course, not desirable. In accordance with the method of this invention, the position of each group relative to its respective window is sensed (as by electric eyes E2L, E2R) and the feed conveyors are shifted to their slower feed rate $F_2$. Thus, the next group to be placed (i.e., group G5) is placed in its window in such position as to not interfere with the forwardmost flight bar defining the forward or leading boundary $W_L$ of its window. With feed conveyor being operated at its slower feed rate $F_2$, groups G5–G8 are placed in their respective windows progressively closer to the trailing boundary $W_T$ of their respective windows W. When an electric eye E2R or E2L senses that a next group to be placed will a least partially extend over the trailing boundary of its window, their respective feeding conveyor is shifted to its higher feed rate $F_1$.

In this manner, groups G (or items I) are continuously fed forward in timed relation to the flight conveyor, and one item (or grouping of items) is then placed in each window W on each operational cycle of the flight conveyor substantially without skipping a cycle of the flight conveyor. It is to be noted that in either the method of or the apparatus for this invention it is not necessary to exactly match the placement of items on the flight conveyor to the cycling rate of the flight rate, but rather it is only necessary to place the item or the unit array of items somewhere in its respective window which may be of much greater length than the item. As described herein, the spacing of flight bars 5 on flight conveyor 3 is shown to be on 34 in. (86 cm.) centers in FIG. 8. Thus window W is about six times longer from its leading to trailing boundaries than a roll of toilet tissue. This gives the apparatus of this invention a great deal of leeway in the placement of items. It is to be understood that upon engagement of the items by the trailing flight bar 5 of the flight conveyor, the item or group is conveyed forward in exact timed relation with respect to the cycling speed of the flight conveyor. The method of this invention as illustrated in FIG. 9, depicts only a few items being placed between the time feeding conveyors 9R, 9L are modulated or shifted between their fast and slow feed rates $F_1$ and $F_2$, but it will be appreciated that in actual operation many items may be placed between the times the feeding rates of the feeding conveyors are modulated. This greatly reduces the frequency with which the feeding conveyors must be shifted and thus extends the service life of the apparatus.

It is to be understood that both feeding conveyors 9R, 9L may be used either alternatively or simultaneously. If, for example, items I are being supplied to apparatus 1 by both supply conveyors 92R and 92L at their respective average supply rates rR and rL, and if only one item I is fed forward from either feeding conveyor on each cycle of flight conveyor 3, apparatus 1 can be operated to effectively balance the feeding of items from each feed conveyor so as to maintain their respective backlogs of items BR and BL balanced within a predetermined range or state. This may be accomplished by feeding from one backlog (for example, backlog BL) for a predetermined length of time, as determined by time-delay relay TDR, and then feeding from the other backlog via its respective feeding conveyor for another predetermined length of time. During the length of time that one of the feeding conveyors is shut down, its supply of items in its respective backlog is being replenished by its respective supply conveyor 92R or 92L. It is to be noted that when the conveying apparatus of this invention is being operated to feed alternately a plurality of items from one of its feeding conveyors and then from the other, one item per cycle, each of the feeding conveyors must be capable of feeding forward items at the cycling rate R of flight conveyor 3.

Apparatus of the present invention is also capable of being operated to feed one item forward from one feeding conveyor, for example from the left feeding conveyor 9L, stopping operation of the left feeding conveyor, and initiating feeding of an item from the right feeding conveyor 9R so that items are fed forward at the cycling rate R of flight conveyor 3, but an item is fed forward from each feeding conveyor only on every other cycle of the flight conveyor. This allows the conveying apparatus of this invention to receive items at a slower rate from independent item supplies and yet allows the overwrap machine 0 to operate at a much higher cycling rate. Generally, the cycling rate R of the flight conveyor and of overwrap machine 3 is equal to the sum of the average feeding rates $r_R$ and $r_L$ of the supply conveyor 92R, 92L. Expressed in mathematical terms, $\epsilon r_i = N \cdot R$, where N is the number of items placed in each window W.

As previously mentioned, the method of this invention can optionally include sensing the state of backlogs BR or BL by sensing the number of items in each backlog or by sensing the length of the backlog by electric eyes E3L or E3R and terminating feeding of one of the backlogs in response to this backlog diminishing below a predetermined state. Feeding of items from the other backlog is then initiated so that the one backlog may be replenished by its respective supply conveyor 92R or 92L to its desired state while the flight conveyor is continuously being fed from the other backlog. In this manner, the backlogs can be automatically balanced even if their supply rates vary significantly over the short run or if their supply rates are appreciably different from one another.

Referring now to FIGS. 4 and 8, flight conveyor 3 as heretofore described, is shown having flights 5 secured to timing belts 19L, 19R at spaced intervals therearound. Flights 5 include a bar 101 which extends transversely across the flight conveyor between timing belts 19R and 19L and each of these bars have a clamp 103R, 103L at each end thereof. Each of these clamps has a slot 104 (see FIG. 13) in its end for receiving a respective timing belt 19L, 19R. As indicated at 105, a groove is provided for reception of a belt cog 20. The lower surfaces of slot 104 angle down away from groove 105 to provide clearance for belts 19L, 19R as they travel around pulleys 17a–17c. The clamp is drawn into clamping engagement with its timing belt by means of a clamp ring 107 thereby to securely fix the flight bar to the timing belts. As indicated at 109 (see FIGS. 2 and 4) timing belt carrier members are clampingly secured to the timing belts at equal intervals between the flight bars. These carrier members are essentially identical to flight bar clamping members 103 and the carrier members and flight bar clamps serve to support the timing belts on rails 111R, 111L below the upper reaches of the timing belts. Pulleys 17a–17d, each have notches 113 therein for reception of flight bar clamp members 103 and carrier members 109. It will be noted that the circumference of pulleys 17a–17c is equal to the spacing between adjacent carrier members 109 or flight bar clamps and that the circumference of pulley 17b is twice the spacing of these members and has two notches 113 therein. Thus, as the timing belts are driven around pulleys 17a–17d, the flight bar clamps and the carrier members are received by notches 113 in the pulleys and these members do not interfere with the timing belts as they are driven around their respective pulley sets.

Figure 14:
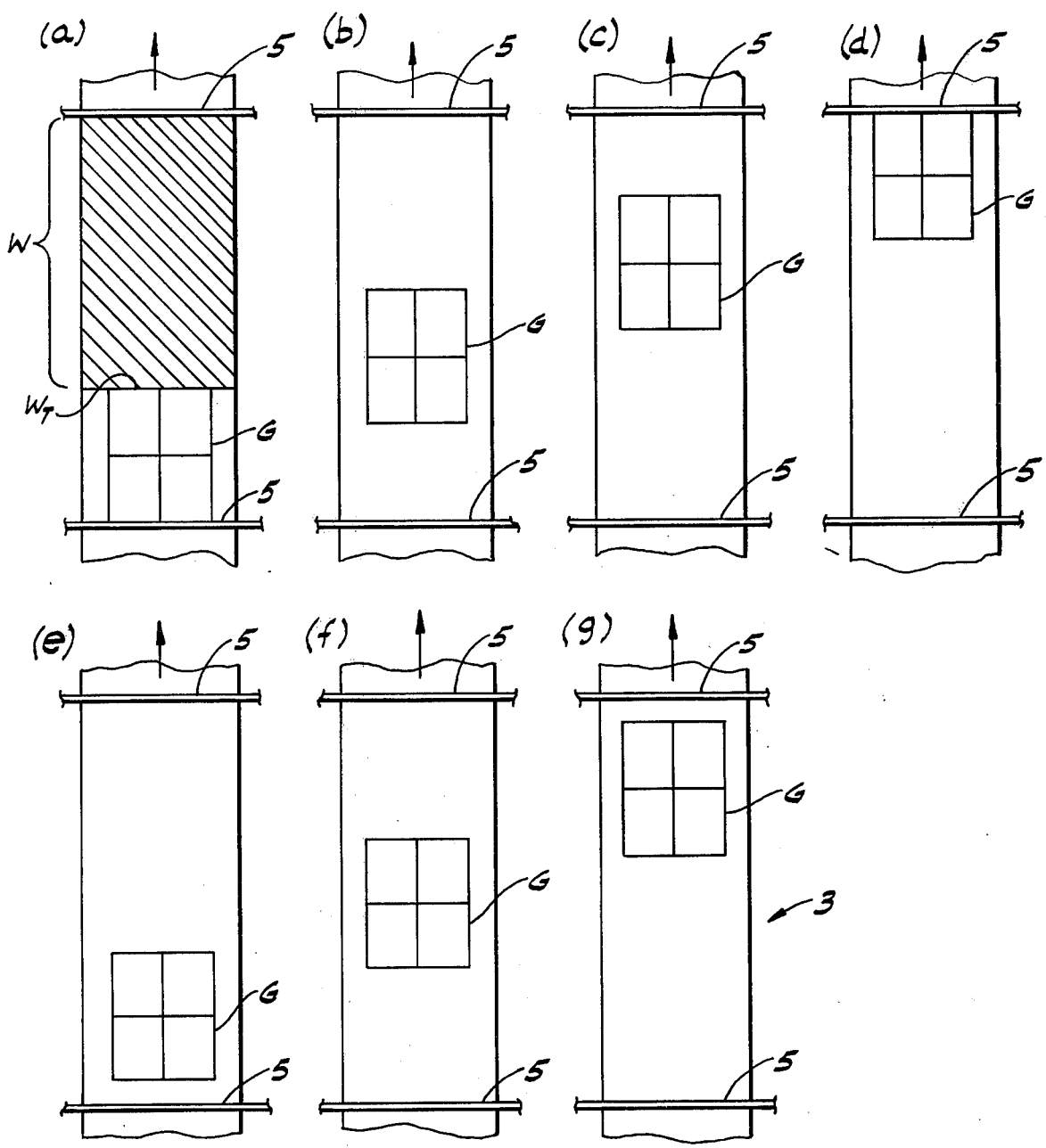
FIGS. 14(a)-14(g) are diagrammatical representations illustrating still another method of this invention.

Another embodiment of the method of this invention is depicted in FIGS. 14a–14g. Briefly, this method involves accumulating a backlog BL or BR of randomly received items I in the manner heretofore described. A selected number of items k (i.e., one or more items) is fed forward from the backlog by a respective feeding conveyor 9L, 9R during each cycle of flight conveyor 3 at a feeding rate $F_1$ faster than the cycling rate R of flight conveyor 3 so that each selected number of items is placed in its respective window W progressively closer to the leading boundary $W_L$ of the window. This method further involves sensing when a selected number of items to be placed in its respective window will at least partially extend beyond the leading edge of the window, and then momentarily delaying feeding of items from the backlog and reinitiating feeding of the items thereby to shift the next selected number of items toward the trailing boundary $W_T$ of its respective window. This shift of the selected number of items relative to its window is shown in FIG. 14e. Of course, the next successive selected number of items would be then fed forward at the faster feeding rate $F_1$ and would be placed in their respective windows progressively closer to the leading boundary $W_L$ of their respective windows.

The apparatus for carrying out the above discussed method is essentially identical to the apparatus 1 heretofore described, except that it does not have low speed clutches 47La, 47Ra. This modified apparatus includes at least one feeding conveyor 9L or 9R for receiving randomly received items and for accumulating a backlog BL or BR of the items. The feeding conveyor then feeds the selected number k of items forward from the backlog during each cycle of flight conveyor 3. The apparatus further includes a drive, as indicated at 61L, 61R, for the feeding conveyors, and means (e.g., intermediate conveyor 21) for conveying forward the selected number of items in timed relation to the flight conveyor and for placement of the selected number of items on the flight conveyor in a respective window W. The feeding conveyors 9L, 9R are driven at a feeding rate $F_1$ to feed forward selected number of items faster than the cycling rate R of the flight conveyor so that each selected number of items is placed in its respective window progressively closer to the leading boundary of its window than the preceding selected number of items. The apparatus further includes means 13L, 13R for sensing when a selected number of items to be replaced in a respective window will at least partially extend beyond the leading boundary $W_L$ of its respective window and for momentarily interrupting the feeding conveyor drive thereby to shift the next to be placed selected number of items toward the trailing boundary $W_T$ of its respective window. This momentary hesitation of feeding is effected by momentarily deenergizing high speed clutch 47Lb, 47Rb and after a slight pause (e.g., a few milliseconds), reenergizing the clutch. This will incrementally slow down feeding conveyors 9L, 9R and will shift the placement of selected number of items (that is, a single item or a grouping of items) toward the rear (i.e., toward the trailing boundary $W_L$) of its window, as shown in FIG. 14e. When operating at its normal rate (for example, 160 cycles/minute) it will be understood that the above-described momentary interruption of the feeding conveyor drive will usually not result in stopping of the feeding conveyors because of the inertia in the drive of the feeding conveyors. It will be further understood that this momentary hesitation could also be accomplished by momentarily driving the feeding conveyors by another drive (e.g., low speed clutches 47La, 47Ra) and then again driving the conveyors at their faster feed rate via high speed clutches 47Lb, 47Rb.

In view of the above, it will be seen that the several objects of the invention are achieved and other advantageous results attained.

As various changes could be made in the above methods and products without departing from the scope of the invention, it is intended that all matter contained in the above description or shown in the accompanying drawings shall be interpreted as illustrative and not in a limiting sense.

What is claimed is:

1. The method of feeding items to apparatus, such as a flight conveyor, which cycles continuously at a steady cycling rate with a predetermined grouping of items being placed on the apparatus during a portion of each cycle thereof, said cycle portion being referred to as a window and the latter having a leading and a trailing boundary, said items being randomly received from a plurality of sources, the method comprising the steps of:

accumulating, for each source, a backlog of items randomly received from that source, the items in each backlog being in substantially end-to-end abutting relationship one with another;

releasing a selected plurality of items from each of said backlogs during each cycle of said apparatus to form said grouping, the items so released from each backlog remaining in substantially end-to-end abutting relationship one with another; and conveying forward said grouping in timed relation to said apparatus and placing said grouping in a respective window of said apparatus.

2. The method of claim 1 wherein there are n sources and backlogs, where n=2, 3 ... n, wherein said selected plurality of items equals k, where k=2, 3 ... k wherein said grouping is an array of items having rows and columns of items with n items in each row and with a selected plurality of items k in each column, said method further comprising, accumulating columns of k items with the items in each column being substantially in end-to-end abutting relation, releasing said accumulated columns, the items so released remaining in substantially end-to-end abutting relationship one with another, and conveying said columns forward for placement in a respective window in timed relation to said apparatus.

3. The method of claim 2 further comprising releasing said columns at either a first feed rate faster than the cycling rate of said apparatus or at a second feed rate slower than said cycling rate of the apparatus so that each column of items is placed in its respective window progressively closer to a boundary of its respective window than the preceding column and sensing when a column of items to be placed in a window conveyed at one feed rate will at least partially extend beyond one boundary of its respective window and effecting the releasing of items from another backlog and the conveying of respective columns of items at the other feed rate so that each column is then placed in its respective window progressively closer to its opposite boundary than the preceding column.

4. The method of feeding items to apparatus, such as a flight conveyor, which cycles continuously at a steady cycling rate with a predetermined grouping of items being placed on the apparatus during a portion of each cycle thereof, said cycle portion being referred to as a window and the latter having a leading and a trailing boundary, said items being randomly received from a plurality of sources, the method comprising the steps of:

accumulating, for each source, a backlog of items randomly received from that source, releasing a selected number of items from each of said backlogs during each cycle of said apparatus in timed relation to said apparatus to form said grouping;

conveying forward said selected number of items in timed relation to said apparatus and placing said selected numbers of items in a respective window of said apparatus;

said releasing occurring at either a first feed rate faster than the cycling rate of said apparatus or at a second feed rate slower than the cycling rate of the apparatus so that each selected number of items is placed in its respective window progressively closer to a boundary of its window than the preceding selected number of items;

sensing when a selected number of items to be placed in a respective window conveyed forward at one feed rate will at least partially extend beyond one boundary of its respective window; and effecting the release of items from the corresponding backlog at the other of said feed rates so that each selected number of items is then placed in its respective window progressively closer to the opposite boundary of its window than the preceding selected number of items.

5. The method of claim 4 comprising conveying said items after release from said backlogs to said apparatus at a lineal speed faster than the lineal speed of said backlogs.

6. The method of feeding items one after the other to apparatus which cycles at a steady cycling rate with an item being fed to the apparatus during a portion of each cycle, said cycle portion being referred to as a window, said items being randomly supplied by first and second supply means with the sum of the average supply rates of the first and second supply means being generally equal to the rate said items are fed to said apparatus, said method comprising the steps of:

accumulating a first backlog of items randomly received from said first supply means;

accumulating a second backlog of items randomly received from said second supply means;

feeding one or more items from said first backlog, one item at a time, and conveying the items forward for placement of the items in a respective window at a rate faster than said first supply rate;

terminating feeding from said first backlog;

initiating feeding of one or more items from said second backlog, one item at a time, and conveying these items from the second backlog forward for placement in a respective window at a rate faster than said second supply rate;

terminating feeding from said second backlog; initiating feeding from said first backlog and repeating the four above-defined steps so as to continuously feed items from said backlogs whereby a selected number of items is placed in each window of said apparatus;

said items being fed from each backlog in timed relation to the cycling of said apparatus at either a first feed rate faster than said cycling rate or at a second rate slower than said cycling rate so that each said item fed forward from one of said backlogs is placed in its respective window progressively closer to either the leading or trailing boundary of said window than the preceding items;

sensing when an item to be placed in a respective window conveyed forward at one feed rate will at least partially extend beyond one boundary of its respective window; and effecting the release of items from the corresponding backlog at the other of said feed rates so that each item is them placed in its respective window progressively closer to the opposite boundary of its window than the preceding item.

7. The method of claim 6 further comprising the steps of sensing the state of said backlogs and terminating feeding from one of said backlogs in response to said one backlog varying from a predetermined state and initiating feeding from the other of said backlogs whereby said one backlog may be replenished by its respective supply means while said apparatus is being fed from the other of said backlogs.

8. The method of claim 7 further comprising terminating feeding from said other backlog in response to said other backlog varying from a predetermined state and initiating feeding from said one backlog whereby said other backlog may be replenished by its respective supply means while said apparatus is being fed by said one backlog.

9. The method of placing N items in between successive flights of a continuously operable flight conveyor operating at a steady cycling rate, said items being supplied by n supply means, each of said supply means randomly supplying said items, said method comprising accumulating n backlogs of items, one backlog for each said supply means, the items in each backlog being in substantially end-to-end abutting relationship, and releasing k items from each of said backlogs with the k items remaining in substantially end-to-end abutting relationship, and conveying them forward for placement between successive flights of said flight conveyor in timed relation to said flights during each cycle of said flight conveyor, where $N=k.n$, where k is an integer greater than one, and wherein the items placed between successive flights are substantially arranged in a grouping of rows and columns with n indicating the number of items in each row and k indicating the number of items in each column.

10. The method of placing a grouping of items in between successive flights of a continuously operable flight conveyor operating at a steady cycling rate, said grouping being comprised of columns and rows of said items, there being n items in each row and k items in each column, where n is an integer greater than 1 and k is an integer greater than 1, said items being randomly supplied by n supply means, said method comprising the steps of:
- accumulating n backlogs of items, one backlog for each of said supply means the items in each backlog being in substantially end-to-end abutting relationship;
- releasing k items from each of said backlogs in timed relation to operation of said flight conveyor to form a column of items for said grouping; the items in each column remaining in substantially end-to-end abutting relationship one with another; and
- conveying said columns of items forward in timed relation to a respective pair of successive flights of said flight conveyor for placement of said columns of items between said respective flights.

11. Apparatus for feeding items to a flight conveyor which is continuously operable at a steady cycling rate with a predetermined grouping of items being placed on said flight conveyor during a portion of each cycle thereof, said cycle portion being referred to as a window, the latter having a leading and a trailing boundary, said items being randomly received from a plurality of sources, said apparatus comprising means for accumulating a plurality of backlogs of items, one backlog for each source, the items in each backlog being in substantially end-to-end abutting relationship one with another and for releasing a selected plurality of items from each backlog, during each cycle of said flight conveyor to form said grouping, the items so released from each backlog remaining in substantially end-to-end abutting relationship one with another and means for conveying forward said selected plurality of items forming said grouping in timed relation to said flight conveyor for placement of said selected plurality of items forming said grouping in a respective window.

12. Apparatus as set forth in claim 11 wherein the apparatus is supplied items from n sources, where $n=2, 3 \ldots n$, said apparatus having n of said feeding means wherein k is said selected number of items, $k=2, 3 \ldots k$, and wherein said grouping is an array of items having rows and columns of items with n items in each row and with k items in each column, and wherein the releasing means includes receiving means for receiving items from each of said backlogs during each cycle of said means so as to form a column of items in which the items are substantially in end-to-end aubtting relation and means for releasing its respective column in timed relation to said flight conveyor for placement of said respective column in its respective window.

13. Apparatus as set forth in claim 12 wherein each said releasing means and its respective said item receiving means operate in timed relation to said flight conveyor either at a first feed rate faster than the cycling rate of said flight conveyor or at a second feed rate slower than the cycling rate of said flight conveyor so that each column of items is placed in its respective window progressively closer to a boundary of its window than the preceding column, and wherein said apparatus further includes means for sensing when a column of items to be placed in a respective window fed forward from its respective backlog and released at one feed rate will at least partially extend beyond one boundary of its respective window and for effecting the release of respective columns at the other of said feed rates so that the next successive column of items is then placed in its respective window progressively closer to the opposite boundary of its window than the preceding column of items.

14. Apparatus as set forth in claim 12 wherein said apparatus includes means for moving said receiving means from a receiving position in which said receiving means receives said selected number of items and forms said column of items and a release position in which said column of items is conveyed for placement in its respective window in timed relation to said flight conveyor.

15. Apparatus as set forth in claim 14 further comprising a conveyor intermediate said feeding means and said means for conveying said items to said means, said receiving means comprising a pair of members spaced apart a distance less than the width of said items and extending above said intermediate conveyor in the direction of movement thereof, said members being of a length sufficient to accumulate said selected number of items thereon, said moving means raising and lowering said members between their stated receiving and release positions.

16. Conveying apparatus as set forth in claim 11 wherein said flight conveyor has a plurality of flights equally spaced from one another, each pair of successive flights defining one of said cycles, and wherein said releasing means comprises a pair of opposed belts gripping said items for positively feeding the items forward at the speed of said opposed belts.

17. Conveying apparatus as set forth in claim 16 wherein said flights on said flight conveyor are spaced apart a distance greater than the length of the item to be placed thereon, and wherein said flight conveyor operates at a lineal speed greater than opposed belts.

18. Conveying apparatus as set forth in claim 16 wherein said flight conveyor includes a belt conveyor at its entrance for receiving said items and for conveying them to a position along the flight conveyor for engagement of the trailing end of the item by a respective flight bar.

19. Conveying apparatus as set forth in claim 11 further comprising means for sensing the length of said backlog and for effecting termination of feeding of said items from said backlog when the backlog is less than a predetermined value.

20. Conveying apparatus as set forth in claim 11 wherein the cycling rate of said means is R cycles per unit time and wherein each of said sources randomly supply said items at an average rate of $r_1, r_2, r_3 \ldots r$ items per unit time where $r_i = N \cdot R$ where N is the number of items placed in each window, and wherein said apparatus further comprises means for initiating operation of one or more of said releasing means to release items for placement of a grouping of items in respective windows of said flight conveyor, and then terminating operation of said one or more of said releasing means and initiating operation of other releasing means thereby to release items for placement of a grouping of items in respective windows of said means substantially skipping placement of a grouping of items in a cycle of said means.

21. Conveying apparatus as set forth in claim 20 wherein said means for initiating operation and termination of said releasing means includes means for effecting releasing from said one or more releasing means or from said other releasing means for a predetermined time interval.

22. Conveying apparatus as set forth in claim 11 further comprising means for terminating releasing of items from said one or more releasing means and effecting the releasing of items from said other said feeding means in response to the state of said backlogs whereby said backlogs are maintained within desired range.

23. Conveying apparatus as set forth in claim 11 wherein said flight conveyor comprises a pair of spaced flexible timing belts, each of said timing belts being trained around a set of pulleys, said flights extending transversely between the timing belts, and means for securing said flights to said timing belts at equal distances therealong, said flight securing means comprising means for clampingly engaging the timing belts, each of said pulleys having at least one notch therein for reception of said flight securing means.

24. Conveying apparatus as set forth in claim 23 comprising one or more carrier members clampingly secured to said timing belts between said flights, said carrier members being equally spaced between said flights and being received by said notches in said pulleys, said flight conveyor further comprising a stationary guide surface spaced below the upper reach of each of said timing belts, said carriers engaging said guide surfaces thereby to support the upper reaches of said timing belts.

25. Apparatus for feeding items to a flight conveyor which is continuously operable at a steady cycling rate with a predetermined grouping of items being placed on said flight conveyor during a portion of each cycle thereof, said cycle portion being referred to as a window, the latter having a leading and a trailing boundary, said items being randomly received from a plurality of sources, said apparatus comprising:
  means for accumulating a plurality of backlogs of items, one backlog for each source;
  means for releasing a selected number of items from each backlog during each cycle of said flight conveyor to form said grouping;
  means for conveying forward said selected number of items forming said grouping in timed relation to said flight conveyor for placement of said selected number of items forming said grouping in a respective window;
  said releasing means operating in timed relation to said flight conveyor either at
  a first feed rate faster than the cycling rate of said flight conveyor or at a second feed rate slower than the cycling rate of said flight conveyor so that each selected number of items is placed in its respective window progressively closer to a boundary of its window than the preceding selected number of items;
  means for sensing when a selected number of items to be placed in a respective window conveyed forward at one feed rate will at least partially extend beyond one boundary of its respective window; and
  shifting means for effecting the releasing of items from its respective backlog at the other of said feed rates so that each selected number of items is then placed in its respective window progressively closer to the opposite boundary of its window than the preceding selected number of items.

26. Conveying apparatus as set forth in claim 25 wherein said shifting means comprises a drive for said releasing means and a clutch interconnecting said drive and said releasing means, said clutch being responsive to a signal generated by said sensing means for shifting said releasing means between its said first and second feed rates.

27. Conveying apparatus as set forth in claim 26 wherein said sensing means comprises a first item sensing means for insuring that the number of said items in said backlogs is above a predetermined number and a second item sensing means for sensing the timing of an item released by said releasing means relative to the position of its respective window before it is placed in its window, said first sensing means terminating releasing of said items if the number of said items in said backlog are not above a predetermined number, said second item sensing means effecting shifting of said releasing means between its first and second feed rates.

* * * * *